(12) United States Patent
Otake et al.

(10) Patent No.: US 8,368,740 B2
(45) Date of Patent: Feb. 5, 2013

(54) MEETING SYSTEM INCLUDING DISPLAY DEVICE AND DATA PROCESSING APPARATUS CONNECTED THERETO, DATA PROCESSING APPARATUS CONNECTED TO DISPLAY DEVICE, DATA OUTPUT METHOD, AND DATA OUTPUT PROGRAM

(75) Inventors: Toshihiko Otake, Ikeda (JP); Hironobu Nakata, Itami (JP); Hiroyuki Kawabata, Kawanishi (JP); Yoshiki Tokimoto, Nishiwaki (JP); Kazumi Sawayanagi, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1008 days.

(21) Appl. No.: 12/185,420

(22) Filed: Aug. 4, 2008

(65) Prior Publication Data

US 2009/0044251 A1    Feb. 12, 2009

(30) Foreign Application Priority Data

Aug. 8, 2007 (JP) ................................. 2007-206334

(51) Int. Cl.
*H04N 7/14* (2006.01)
*H04N 7/15* (2006.01)

(52) U.S. Cl. .... 348/14.1; 705/51; 348/14.08; 348/14.09

(58) Field of Classification Search .................... 705/51; 725/24; 455/414
See application file for complete search history.

(56) References Cited

U.S. PATENT DOCUMENTS

| | | | |
|---|---|---|---|
| 5,408,623 A * | 4/1995 | Dolidon et al. | 712/248 |
| 5,721,583 A * | 2/1998 | Harada et al. | 725/24 |
| 6,286,034 B1 | 9/2001 | Sato et al. | |
| 6,609,199 B1 * | 8/2003 | DeTreville | 713/172 |
| 6,697,944 B1 * | 2/2004 | Jones et al. | 713/168 |

(Continued)

FOREIGN PATENT DOCUMENTS

| | | |
|---|---|---|
| JP | 9-214618 | 8/1997 |
| JP | 2000-49992 | 2/2000 |

(Continued)

OTHER PUBLICATIONS

Japanese Notice of Ground of Rejection mailed on Jul. 21, 2009, directed to counterpart Japanese Patent Application No. 2007-206334; 7 pages.

(Continued)

*Primary Examiner* — Evens J Augustin
(74) *Attorney, Agent, or Firm* — Morrison & Foerster LLP

(57) ABSTRACT

In order to prevent leakage of confidential data, a meeting system includes a MFP and a projector. The MFP includes a data obtaining portion to obtain data, a participant information obtaining portion to obtain user identification information as participant information, an access permission determination portion and an output permission determination portion to determine whether or not a user identified by the participant information can access the obtained data, to determine that the obtained data can be output if the determination result shows that all the meeting participants can access the obtained data, and to determine that the obtained data cannot be output if any one of the meeting participants cannot access the obtained data, and an output portion to output data on condition that it is determined by the output permission determination portion that data can be output. The display device displays an image based on the data output from the data processing apparatus.

14 Claims, 18 Drawing Sheets

U.S. PATENT DOCUMENTS

| | | | | |
|---|---|---|---|---|
| 6,965,770 | B2 * | 11/2005 | Walsh et al. | 455/426.1 |
| 6,990,580 | B2 * | 1/2006 | Go et al. | 713/168 |
| 7,069,451 | B1 * | 6/2006 | Ginter et al. | 705/51 |
| 7,073,063 | B2 * | 7/2006 | Peinado | 713/171 |
| 7,080,037 | B2 * | 7/2006 | Burger et al. | 705/50 |
| 7,100,195 | B1 * | 8/2006 | Underwood | 726/2 |
| 7,104,958 | B2 * | 9/2006 | Crutchfield et al. | 600/454 |
| 7,257,834 | B1 * | 8/2007 | Boydstun et al. | 726/1 |
| 7,263,717 | B1 * | 8/2007 | Boydstun et al. | 726/4 |
| 7,272,859 | B2 * | 9/2007 | Kuriya et al. | 726/29 |
| 7,346,930 | B1 * | 3/2008 | Boydstun et al. | 726/29 |
| 7,437,614 | B2 * | 10/2008 | Haswell et al. | 714/38.13 |
| 7,440,567 | B2 * | 10/2008 | Wellons et al. | 379/265.09 |
| 7,604,599 | B2 * | 10/2009 | Mozayeni et al. | 600/454 |
| 7,953,979 | B2 * | 5/2011 | Borneman et al. | 713/175 |
| 2002/0137496 | A1 * | 9/2002 | Nagaoka et al. | 455/414 |
| 2005/0062844 | A1 * | 3/2005 | Ferren et al. | 348/14.08 |
| 2006/0048205 | A1 * | 3/2006 | Poslinski | 725/134 |
| 2006/0090127 | A1 * | 4/2006 | Silverbrook et al. | 715/512 |
| 2006/0129817 | A1 * | 6/2006 | Borneman et al. | 713/170 |
| 2007/0016046 | A1 * | 1/2007 | Mozayeni et al. | 600/443 |
| 2007/0286487 | A1 * | 12/2007 | Silverbrook et al. | 382/187 |
| 2009/0030881 | A1 * | 1/2009 | Hoile et al. | 707/3 |
| 2009/0319916 | A1 * | 12/2009 | Gudipaty et al. | 715/753 |

FOREIGN PATENT DOCUMENTS

| | | |
|---|---|---|
| JP | 2004-38886 | 2/2004 |
| JP | 2005-56332 | 3/2005 |
| JP | 2005-197796 | 7/2005 |
| JP | 2005-260739 | 9/2005 |
| JP | 2006-106890 A | 4/2006 |

OTHER PUBLICATIONS

Chinese Office Action dated Mar. 29, 2010, directed to corresponding Chinese Patent Application No. 200810145827.6; 20 pages.

Japanese Office Action mailed Apr. 27, 2010, directed to counterpart Japanese Application No. 2007-206334; 7 pages.

* cited by examiner

USER MANAGEMENT TABLE

| USER IDENTIFICATION INFORMATION | AUTHENTICATION INFORMATION | GROUP INFORMATION |
|---|---|---|
| USER ID | PASSWORD BIOMETRIC INFORMATION (VOICE PATTERN) | GROUP NAME |

PROXY AUTHENTICATION TABLE

| PRINCIPAL ID | PROXY ID | RESTRICTION CONDITION |
|---|---|---|
| USER ID | USER ID | PERIOD/NUMBER OF TIMES |

BOX MANAGEMENT TABLE

| BOX NAME | ATTRIBUTE | OWNER | ACCESS PERMISSION (READ, WRITE) |
|---|---|---|---|
| DESIGNATION | GROUP/PERSONAL | USER ID/GROUP NAME | USER ID/GROUP NAME |

MEETING ROOM MANAGEMENT TABLE

| DESTINATION APPARATUS | | USER RECOGNITION APPARATUS | |
|---|---|---|---|
| APPARATUS NAME | APPARATUS IDENTIFICATION INFORMATION | APPARATUS NAME | APPARATUS IDENTIFICATION INFORMATION |
| PROJECTOR A | 198.100.100.1 | READER A | 198.100.100.4 |
| PROJECTOR B | 198.100.100.2 | READER B | 198.100.100.5 |
| PROJECTOR C | 198.100.100.3 | READER C | 198.100.100.6 |

FIG. 12

VIEWING NOT AVAILABLE

PLEASE CONTACT MEETING MANAGER
**** (EXTENSION 1234).

F I G. 1 8
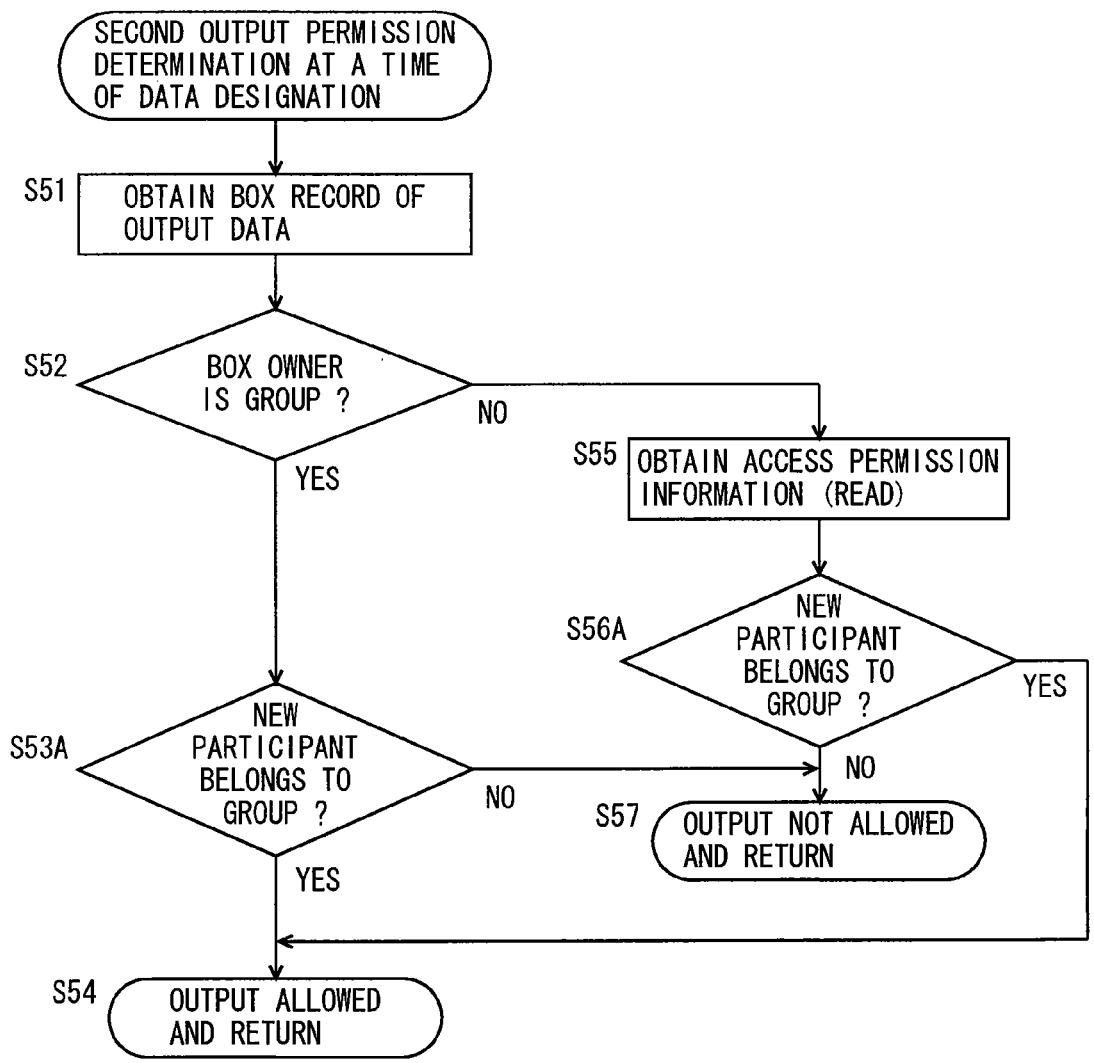

US 8,368,740 B2

MEETING SYSTEM INCLUDING DISPLAY DEVICE AND DATA PROCESSING APPARATUS CONNECTED THERETO, DATA PROCESSING APPARATUS CONNECTED TO DISPLAY DEVICE, DATA OUTPUT METHOD, AND DATA OUTPUT PROGRAM

This application is based on Japanese Patent Application No. 2007-206334 filed with Japan Patent Office on Aug. 8, 2007, the entire content of which is hereby incorporated by reference.

BACKGROUND OF THE INVENTION

1. Field of the Invention

The present invention relates to a meeting system, a data processing apparatus, a data output method, and a data output program, and more particularly to a meeting system including a display device such as a projector and a data processing apparatus connected thereto, a data processing apparatus connected to a display device such as a projector, a data output method performed in the data processing apparatus, and a data output program.

2. Description of the Related Art

In recent years, projectors may be used in meetings, presentations, and the like. A projector projects an input image on a screen. Therefore, many people can view the same image at the same time. For example, Japanese Laid-Open Patent Publication No. 2005-197796 discloses a technique in which an image file is created by sensing an object drawn on the board surface of an electronic board, information about a user actually present at a particular location actually positioned in the vicinity of the electronic board is collected, and with the information about the user set as an output destination of the image file, the image file is output to the destination. According to this technique, all of the participants in a meeting or presentation see the object drawn on the board surface of the electronic board, and in addition, the image file of the object is transmitted to all the participants. Therefore, if the object dawn on the board surface of the electronic board includes confidential information, the confidentiality cannot be maintained. Moreover, the image of information that is confidential to a part of participants but is not confidential to the other participants may be erroneously formed on the board surface.

On the other hand, Japanese Laid-Open Patent Publication No. 2005-260739 discloses a whiteboard device system in which an image drawn on a first whiteboard device is formed on a second whiteboard device. Here, the image drawn on the first whiteboard device in a particular color is replaced with data representing a background color and then formed on the second white board device. According to this technique, the image drawn on the first whiteboard device in a particular color is not formed on the second whiteboard device, so that the image drawn in a particular color can be kept secret to a person who sees the second whiteboard. However, a person who sees the first whiteboard device can see the image drawn in a particular color and therefore secrecy cannot be kept.

SUMMARY OF THE INVENTION

The present invention is made to solve the aforementioned problem. An object of the present invention is to provide a meeting system capable of preventing leakage of confidential data.

An object of the present invention is to provide a data processing apparatus capable of preventing leakage of confidential data.

Another object of the present invention is to provide a data output method and a data output program capable of preventing leakage of confidential data.

In order to achieve the aforementioned objects, in accordance with an aspect of the present invention, a meeting system includes a data processing apparatus and a display device. The data processing apparatus includes: a data obtaining portion to obtain data; a participant information obtaining portion to obtain user identification information for identifying a user as participant information indicating a meeting participant; an access permission determination portion to determine whether or not a user identified by the participant information can access the obtained data, based on the participant information; an output permission determination portion to determine that the obtained data can be output, if all of the meeting participants can access the obtained data, as a result of determination by the access permission determination portion, and to determine that the obtained data cannot be output, if any one of the meeting participants cannot access the obtained data; and an output portion to output the data to the display device on condition that it is determined by the output permission determination portion that the data can be output. The display device displays an image based on the data output from the data processing apparatus.

In accordance with another aspect of the present invention, a data processing apparatus connected to a display device to display an image includes: a data obtaining portion to obtain data; a participant information obtaining portion to obtain user identification information for identifying a user as participant information indicating a meeting participant; an access permission determination portion to determine whether or not a user identified by the participant information can access the obtained data, based on the participant information; an output permission determination portion to determine that the obtained data can be output, if all of the meeting participants can access the obtained data, as a result of determination by the access permission determination portion, and to determine that the obtained data cannot be output, if any one of the meeting participants cannot access the obtained data; and an output portion to output the data to the display device on condition that it is determined by the output permission determination portion that the data can be output.

In accordance with a further aspect of the present invention, a data output method performed in a data processing apparatus connected to a display device to display an image includes the steps of: obtaining data for display; obtaining user identification information for identifying a user as participant information indicating a meeting participant; determining whether or not a user identified by the participant information can access the obtained data, based on the participant information; if all of the meeting participants can access the obtained data, as a result of determination in the step of determining whether to access, determining that the obtained data can be output, and if any one of the meeting participants cannot access the obtained data, determining that the obtained data cannot be output; and outputting the data to the display device on condition that it is determined, in the step of determining whether to output, that the data can be output.

In accordance with a still further aspect of the present invention, a data output program embodied on a computer readable medium causes a computer, which controls a data processing apparatus connected to a display device to display an image, to execute processing including the steps of: obtaining data for display; obtaining user identification information for identifying a user as participant information indicating a meeting participant; determining whether or not a user identified by the participant information can access the obtained data, based on the participant information; if all of the meeting participants can access the obtained data, as a result of determination in the step of determining whether to access, determining that the obtained data can be output, and if any one of the meeting participants cannot access the obtained data, determining that the obtained data cannot be output; and outputting the data to the display device on condition that it is determined, in the step of determining whether to output, that the data can be output.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing an exemplary format of a user management table.

FIG. 9 is a diagram showing an exemplary format of a proxy authentication table.

FIG. 10 is a diagram showing an exemplary format of a BOX management table.

FIG. 11 is a diagram showing an exemplary meeting room management table.

FIG. 12 is a diagram showing an exemplary prohibition image.

FIG. 18 is a flowchart showing an exemplary flow of a second output permission determination process at a time of data designation.

DESCRIPTION OF THE PREFERRED EMBODIMENTS

Figure 1:
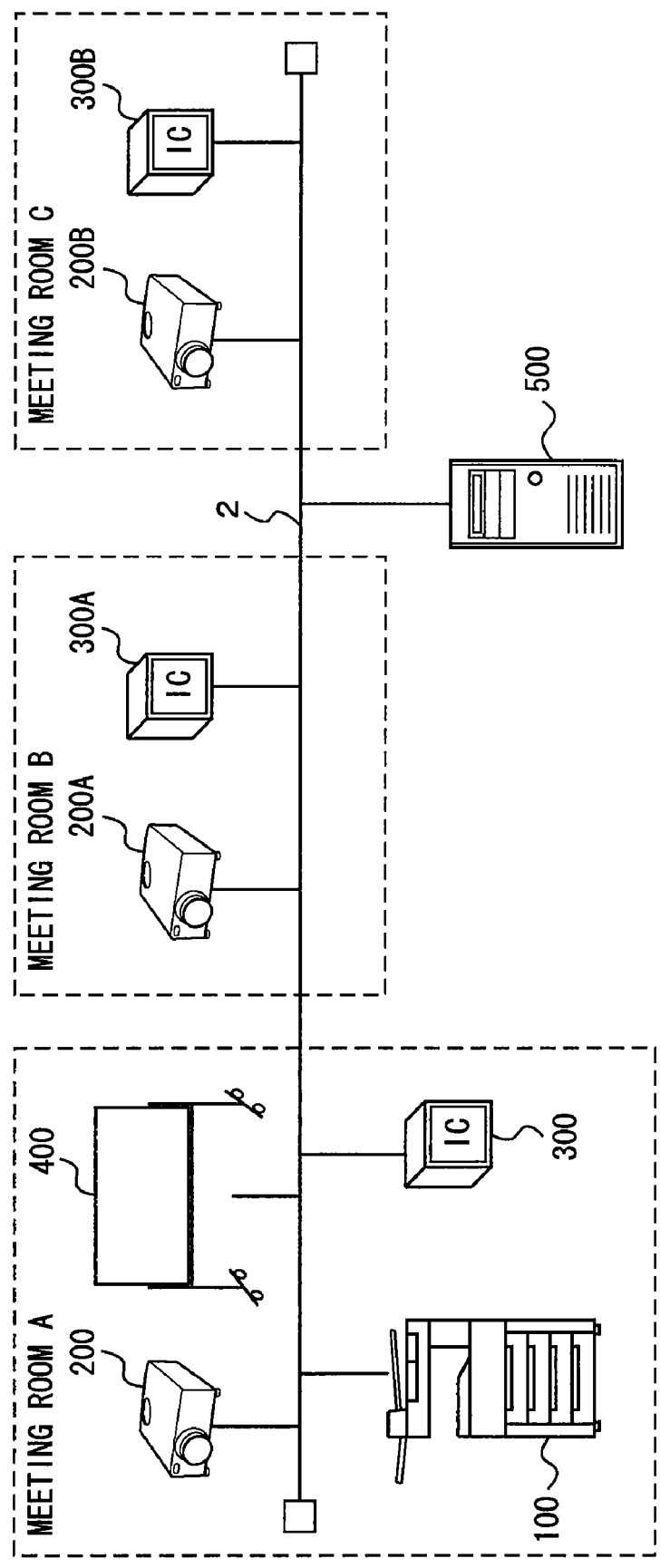
FIG. 1 is a diagram schematically showing the entire meeting system in an embodiment of the present invention.

In the following, an embodiment of the present invention will be described with reference to the figures. In the following description, the same parts will be denoted with the same reference characters. Their designations and functions are also the same. Therefore, detailed description thereof will not be repeated.

FIG. 1 is a diagram schematically showing the entire meeting system in an embodiment of the present invention. Referring to FIG. 1, a meeting system 1 is divided into meeting rooms A, B, C which are physically separated spaces, and a network 2 is constructed for meeting rooms A, B, C. In meeting room A, a MFP (Multi Function Peripheral) 100, a projector 200, a whiteboard 400, and a user recognition apparatus 300 are installed, each connected to network 2. In meeting room B, a projector 200A and a user recognition apparatus 300A are installed, each connected to network 2. In meeting room C, a projector 200B and a user recognition apparatus 300B are installed, each connected to network 2.

Network 2 is a local area network (LAN), whether wired or wireless. Network 2 is not limited to a LAN, or may be a wide area network (WAN), a public switched telephone network (PSTN), the Internet, or the like.

MFP 100 can communicate with projectors 200, 200A, 200B, whiteboard 400, and user recognition apparatuses 300, 300A, 300B via network 2.

User recognition apparatuses 300, 300A, 300B are arranged at locations easily accessible by a person entering or leaving each of meeting room A, meeting room B and meeting room C, for example, at the respective doorways of meeting room A, meeting room B and meeting room C.

It is noted that although MFP 100 is illustrated as an example of the data processing apparatus in the present embodiment, MFP 100 may be replaced, for example, by a scanner, a printer, a facsimile, a computer, or the like as long as a function of storing and processing data is provided. Here, three physically-separated spaces, namely, meeting room A, meeting room B and meeting room C are arranged, by way of example. However, the number of spaces is not limited thereto, and only meeting room A may be arranged, or a combination of two meeting rooms A and B may be arranged, or a combination of meeting room A and a plurality of meeting rooms having the similar configuration to that of meeting room B or meeting room C may be arranged.

Figure 2:
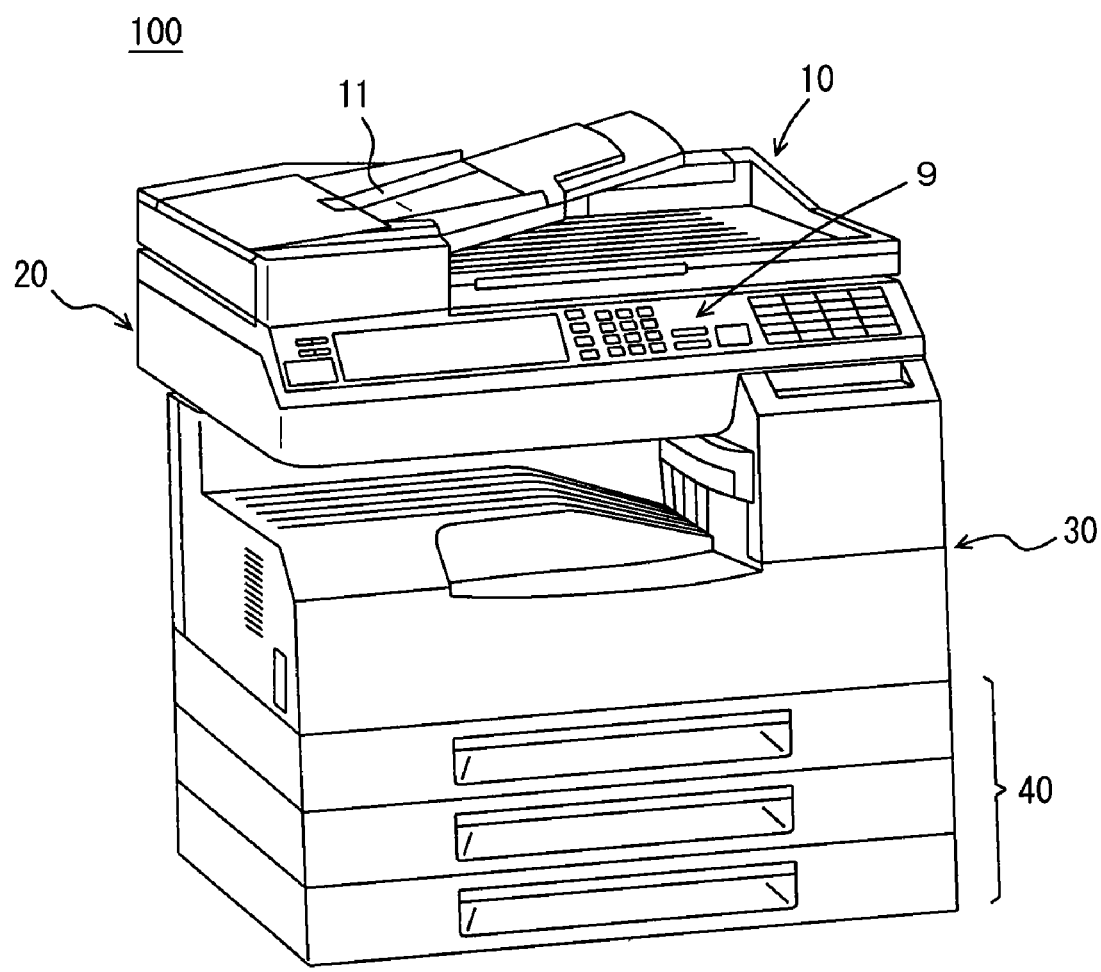
FIG. 2 is an external perspective view of MFP.

FIG. 2 is an external perspective view of MFP. Referring to FIG. 2, MFP 100 includes an automatic document feeder (ADF) 10, an image reading portion 20, an image formation portion 30, and a paper-feeding portion 40. ADF 10 conveys an original document having a number of pages set on a document stage 11, one by one in order, to image reading portion 20. Image reading portion 20 optically reads image information such as photographs, characters, pictures and the like from the original document to obtain image data.

Image formation portion 30 receives image data to form an image on a sheet of paper based on the image data. Image formation portion 30 forms a color image using toner of four colors of cyan, magenta, yellow and black. In addition, image formation portion 30 also forms a monochrome image using toner of any one color of cyan, magenta, yellow and black.

Paper-feeding portion 40 stores paper and supplies the stored paper sheet by sheet to image formation portion 30. MFP 100 includes an operation panel 9 on the top surface.

Figure 3:
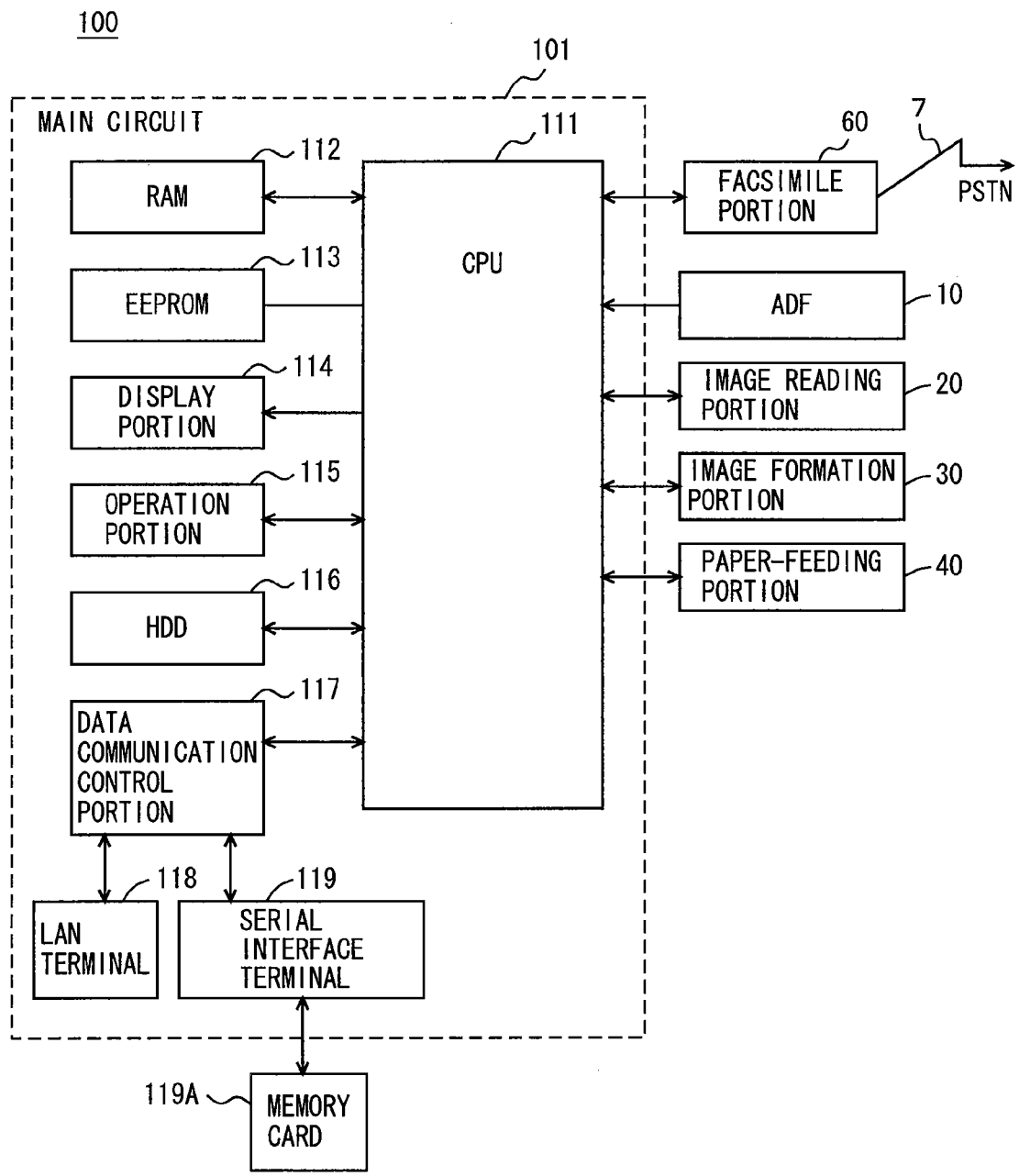
FIG. 3 is a block diagram showing an exemplary hardware configuration of MFP.

FIG. 3 is a block diagram showing an exemplary hardware configuration of MFP. Referring to FIG. 3, MFP 100 includes a main circuit 101. Main circuit 101 is connected to a facsimile portion 60, ADF 10, image reading portion 20, image formation portion 30, and paper-feeding portion 40. Main circuit 101 includes a central processing circuit (CPU) 111, a RAM (Random Access Memory) 112 used as a work area for CPU 111, an EEPROM (Electronically Erasable Programmable Read Only Memory) 113 for storing a program executed by CPU 111 and the like, a display portion 114, an operation portion 115, a hard disk drive (HDD) 116 as a mass storage device, and a data communication control portion 117. CPU 111 is connected to each of display portion 114, operation portion 115, HDD 116, and data communication control portion 117 to control the entire main circuit 101. CPU 111 is also connected to facsimile portion 60, ADF 10, image reading portion 20, image formation portion 30, and paper-feeding portion 40 to control the entire MFP 100.

Display portion 114 is a display such as a liquid crystal display (LCD) or an organic ELD (Electro Luminescence Display) to display instruction menus for the user, information about the obtained image data, and the like. Operation portion 115 includes a plurality of keys and accepts inputs of a variety of instructions and data such as characters and numerals by the user's operations corresponding to keys. Operation portion 115 includes a touch-panel provided on display portion 114. Display portion 114 and operation portion 115 constitute operation panel 9.

Data communication control portion 117 has a LAN terminal 118 which is an interface for communications via a communication protocol such as TCP (Transmission Control Protocol) or UDP (User Datagram Protocol), and a serial interface terminal 119 for serial communications. Data communication control portion 117 transmits/receives data to/from external equipment connected to LAN terminal 118 or serial interface terminal 119, according to an instruction from CPU 111.

When a LAN cable for connecting to network 2 is connected to LAN terminal 118, data communication control portion 117 can communicate with projectors 200, 200A, 200B, whiteboard 400, and user recognition apparatuses 300, 300A, 300B through LAN terminal 118.

CPU 111 controls data communication control portion 117 to read a program executed by CPU 111 from a memory card 119A and store the read program into RAM 112 for execution. It is noted that a recording medium storing a program executed by CPU 111 is not limited to memory card 119A and may be a medium such as a flexible disk, a cassette tape, an optical disk (CD-ROM (Compact Disc-Read Only Memory)/MO (Magnetic Optical Disc/MD (Mini Disc)/DVD (Digital Versatile Disc)), an IC card, an optical card, or a semiconductor memory such as a mask ROM, EPROM (Erasable Programmable ROM), or EEPROM (Electronically EPROM). Alternatively, CPU 111 may download a program from a computer connected to the Internet for storage into HDD 116, or a computer connected to the Internet may write a program into HDD 116 so that the program stored in HDD 116 is loaded into RAM 112 and executed by CPU 111. The program referred to herein includes not only a program directly executable by CPU 111 but also a source program, a compressed program, an encrypted program, and the like.

Facsimile portion 60 is connected to PSTN 7 to transmit facsimile data to PSTN 7 or receive facsimile data from PSTN 7. Facsimile portion 60 stores the received facsimile data into HDD 116 or prints facsimile data on paper by image formation portion 30. In addition, facsimile portion 60 converts the data stored in HDD 116 into facsimile data for output to a facsimile machine or another MFP connected to PSTN 7. Thus, the data stored in HDD 116 can be output to a facsimile machine or another MFP.

Figure 4:
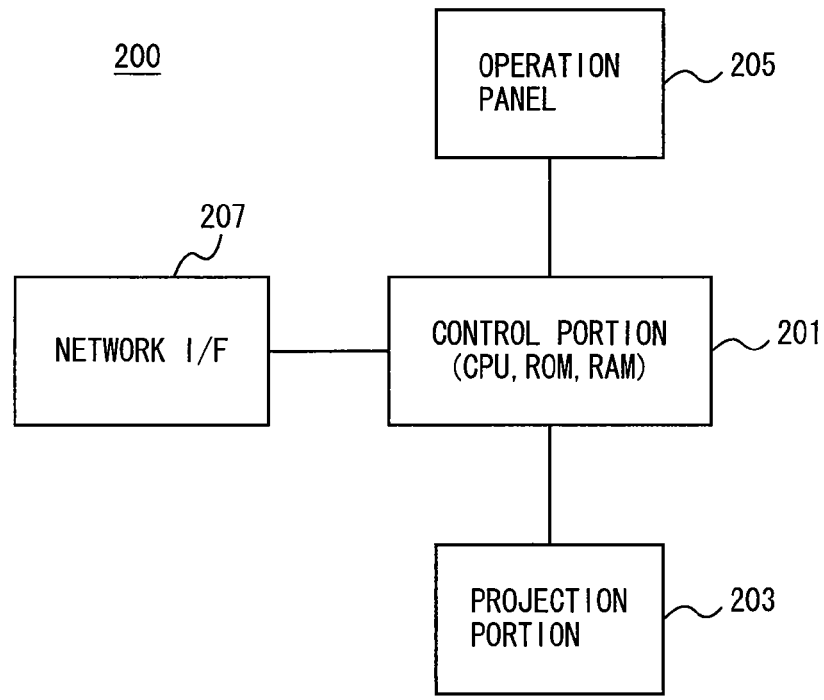
FIG. 4 is a functional block diagram showing an exemplary overall function of a projector.

Projectors 200, 200A, 200B have the same configuration and functions and therefore projector 200 will be illustrated as an example here. FIG. 4 is a functional block diagram of an exemplary overall function of the projector. Referring to FIG. 4, projector 200 includes a control portion 201 for controlling the entire projector 200, a network I/F 207 for connecting projector 200 to network 2, an operation panel 205, and a projection portion 203 projecting an image.

Control portion 201 includes a CPU, a RAM used as a work area, and a ROM for storing a program executed by CPU. Control portion 201 receives data from MFP 100 through network I/F 207 to convert the received data into a format for projection and output the data for projection to projection portion 203. Projection portion 203 includes a liquid crystal display, a lens and a light source. The liquid crystal display displays data input from control portion 201. Light emitted from the light source transmits through the liquid crystal display and radiates to the outside through the lens. The light radiating from projection portion 203 is applied to a screen, so that an image formed by enlarging the image appearing on the liquid crystal display is shown on the screen. In meeting room A, the screen is the board surface of whiteboard 400. In meeting room B or meeting room C, a dedicated screen is used. Any surface such as a wall can be used as long as it has high reflectivity, and in that case, a screen does not have to be installed. Operation panel 205 is a user interface and includes a display portion such as a liquid crystal display and an operation portion including a plurality of keys.

Figure 5:
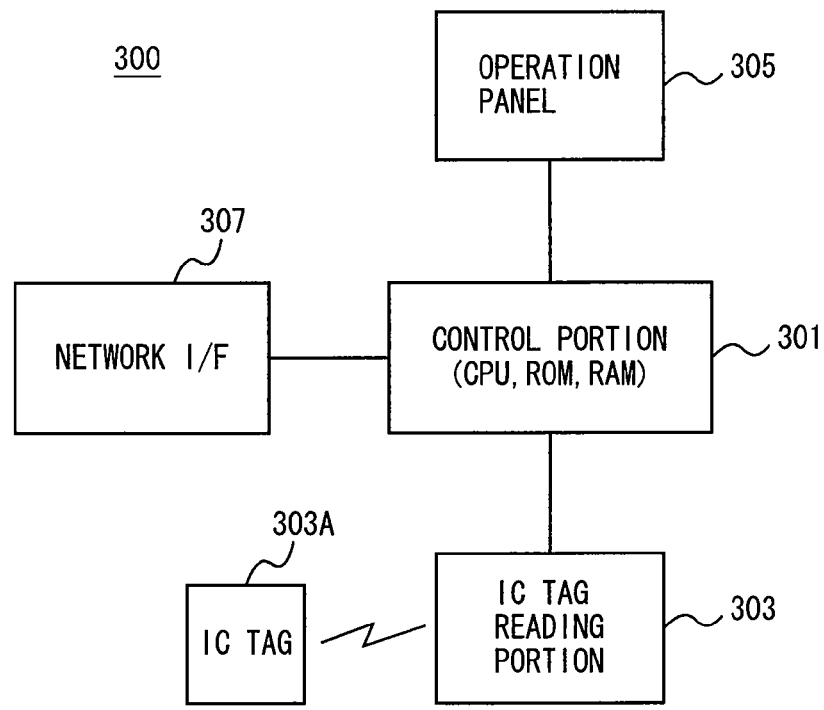
FIG. 5 is a functional block diagram showing an exemplary overall function of a user recognition apparatus.

User recognition apparatuses 300, 300A, 300B have the same configuration and functions and therefore user recognition apparatus 300 will be described as an example here. FIG. 5 is a functional block diagram showing an exemplary overall function of user recognition apparatus 300. Referring to FIG. 5, user recognition apparatus 300 includes a control portion 301 for controlling the entire user recognition apparatus 300, a network I/F 307 for connecting user recognition apparatus 300 to network 2, an operation panel 305, and an IC tag reading portion 303.

Control portion 301 includes a CPU, a RAM used as a work area, and a ROM for storing a program executed by CPU. Operation panel 305 is a user interface and includes a display portion such as a liquid crystal display and an operation portion including a plurality of keys.

IC tag reading portion 303 wirelessly communicates with an IC tag 303A. IC tag 303A includes a radio communication portion and a semiconductor memory and has a user ID stored in the memory for identifying the owner of IC tag 303A. IC tag 303A communicates with IC tag reading portion 303 when it comes into a communicable distance from IC tag reading portion 303. IC tag 303A transmits the user ID stored in the semiconductor memory to IC tag reading portion 303. IC tag reading portion 303 receives the user ID from IC tag 303A and outputs the user ID to control portion 301. Control portion 301 temporarily stores the user ID in RAM. Control portion 301 receives a transmission request for participant information from MFP 100 through network I/F 307 to transmit the user ID temporarily stored in RAM.

IC tag reading portion 303 preferably manages entrance/exit into/from meeting room A and stores the user ID of a user present in meeting room A into RAM. In this case, for example, an entrance key and an exit key are provided on operation panel 305 of IC tag reading portion 303 so that an entrance mode and an exit mode can be switched. Then, when being switched to the entrance mode, IC tag reading portion 303 receives a user ID to store the user ID in RAM, and when being switched to the exit mode, IC tag reading portion 303 receives a user ID to delete the same user ID as the received user ID from user IDs stored in RAM.

Here, user IDs may not be stored in IC tag 303A. An identification number assigned to IC tag 303A may be stored and the identification number assigned to IC tag 303A may be associated with the user ID in MFP 100. Here, IC tag 303A and IC tag reading portion 303 wirelessly communicate with each other, by way of example. However, a recording medium such as a magnetic tape may be attached to IC tag 303A and the information stored in the recording medium may be read by IC tag reading portion 303.

Figure 6:
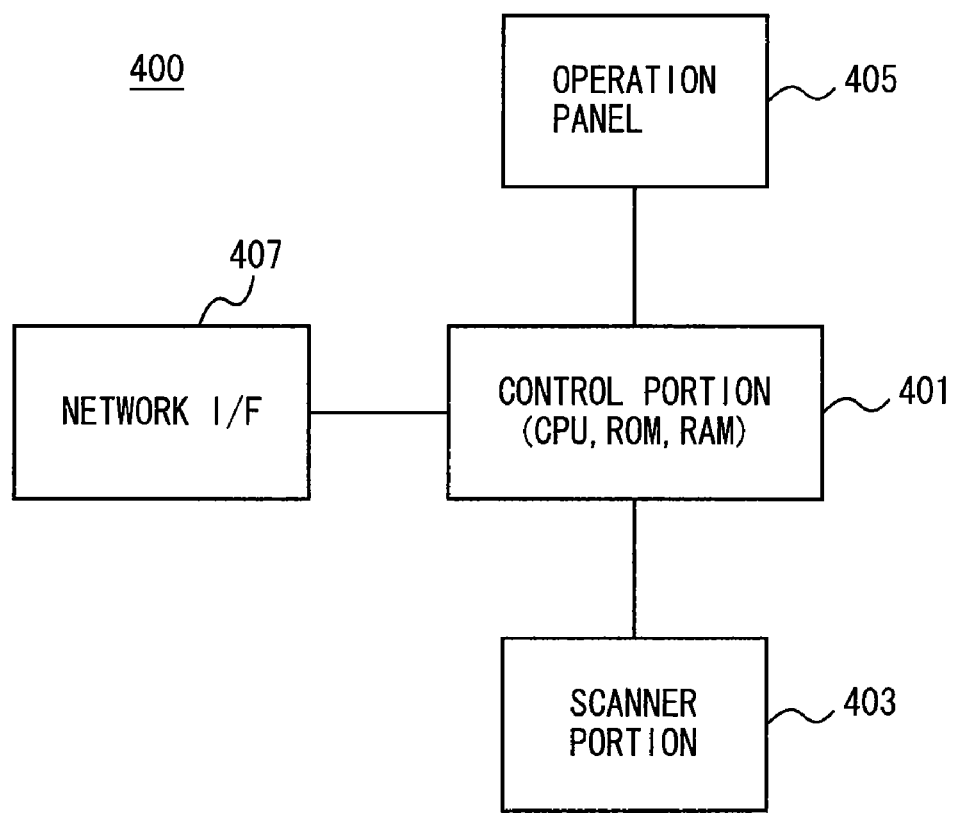
FIG. 6 is a functional block diagram showing an exemplary overall function of a whiteboard.

FIG. 6 is a functional block diagram showing an exemplary overall function of whiteboard 400. Referring to FIG. 6, whiteboard 400 includes a control portion 401 for controlling the entire whiteboard 400, a network I/F 407 for connecting whiteboard 400 to network 2, an operation panel 405, and a scanner portion 403.

Control portion 401 includes a CPU, a RAM used as a work area, and a ROM for storing a program executed by CPU. Operation panel 405 is a user interface and includes a display portion such as a liquid crystal display and an operation portion including a plurality of keys.

Whiteboard 400 has a board surface on which information and the like can be written by a marker pen and the like. The board surface is formed, for example, of a white surface having high reflectivity. The board surface has high reflectivity and thus shows an image when being irradiated with light from projector 200.

Scanner 403 includes a light source and a photoelectric conversion device such as a CCD (Charge Coupled Device) sensor to read an image drawn on the board surface and convert the same into an image as an electrical signal. Scanner 403 outputs the image to control portion 401. Here, a digital camera may be used in place of scanner 403. In this case, control portion 401 receives a picked-up image (electronic data) obtained by a digital camera picking up an image on the board surface.

When a reading instruction button provided on operation panel 405 is pressed by a user, control potion 401 accepts a reading instruction from operation panel 405. Upon input of the reading instruction, control portion 401 controls scanner portion 403 to allow it to read an image drawn on the board surface. Then, control portion 401 transmits the image input from scanner portion 403 to MFP 100 through network I/F 407.

Figure 7:
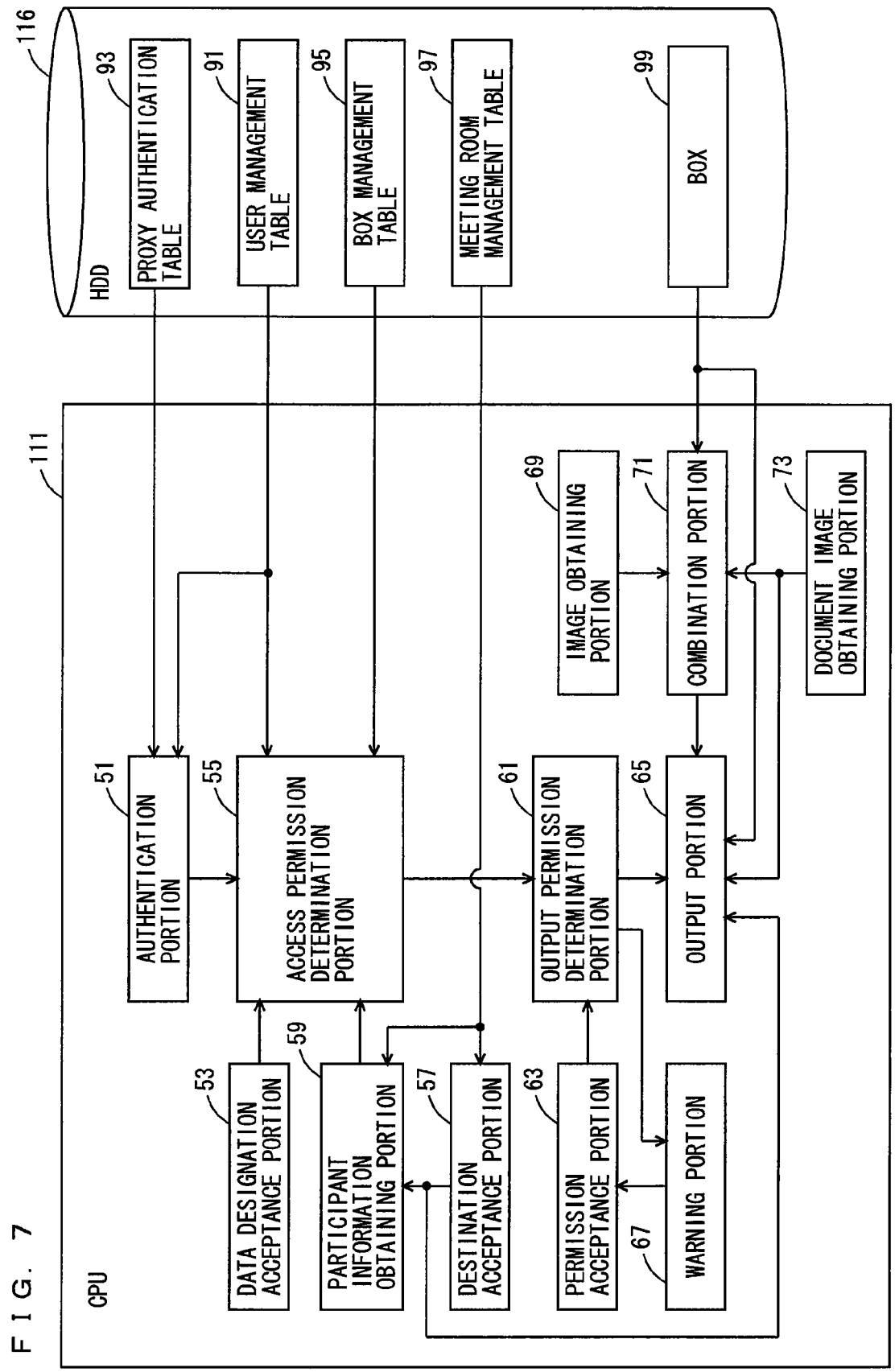
FIG. 7 is a functional block diagram showing an exemplary function of CPU of MFP together with data stored in HDD.

FIG. 7 is a functional block diagram showing an exemplary function of CPU of MFP together with data stored in HDD. HDD 116 included in MFP 100 in the present embodiment includes a plurality of storage regions. Each of a plurality of storage regions is referred to as a BOX herein. BOX includes a personal BOX and a group BOX. Personal BOX is a storage region assigned to each of a plurality of users registered as users who use MFP 100. Group BOX is a storage region assigned to two or more users of a plurality of users. Personal BOX and group BOX are accessible only by respective users registered therein. Alternatively, access by a user other than the registered users may be limited in some way. In the figure, only one BOX 99 is shown. However, the number of BOXes may be more than one.

HDD 116 additionally stores a user management table 91, a proxy authentication table 93, a BOX management table 95, and a meeting room management table 97. User management table 91 includes a user record in which user ID for identifying a user, authentication information, and group information defining the group to which the user belongs are associated with each other. When information about a user is preliminarily input to MFP 100, a user management record is generated and then added to user management table 91.

FIG. 8 is a diagram showing an exemplary format of the user management table. Referring to FIG. 8, user management table 91 includes items of user identification information, authentication information and group information. In the item of user identification information, user identification information for identifying a user is set, and a user ID is used as user identification information here. In the item of authentication information, authentication information for authenticating a user is set, and a password and a voice pattern are used as authentication information here. Biometric information such as finger prints, voice patterns, irises, and veins may be used as authentication information. In the item of group information, group identification information for identifying a group to which a user belongs to is set, and a group name is set here. The group includes, for example, a belonging group in which people are grouped together irrespective of a department or an organization to which a user belongs to.

FIG. 9 is a diagram showing an exemplary format of the proxy authentication table. Proxy authentication table 93 includes a proxy authentication record in which a principal and a proxy are associated with each other to allow a user as a proxy for a principal to log in to MFP 100 on behalf of the principal. When information about proxy authentication is preliminarily input to MFP 100, a proxy authentication record is generated and then added to proxy authentication table 93. Referring to FIG. 9, proxy authentication table 93 includes items of a principal ID, a proxy ID and a restriction condition. In the principal ID, user ID of a principal user is set, and in the proxy ID, user ID of a proxy user is set. In the restriction condition, a restriction condition is defined on which a proxy is permitted to log in on behalf of a principal. The restriction condition includes a period of time during which a log-in is permitted, the number of times of log-in, and the like. A proxy user is allowed to log in to MFP 100 on behalf of a principal within the range of restriction condition. However, when the restriction condition is not met, the proxy authentication record is deleted from the proxy authentication table, so that a log-in to MFP 100 is not allowed.

FIG. 10 is a diagram showing an exemplary format of the BOX management table. BOX management table 95 includes a BOX management record in which access right is associated with each BOX. When BOX is generated in HDD 116 of MFP 100, a BOX management record is generated and then added to BOX management table 95. Referring to FIG. 10, BOX management table 95 includes items of a BOX name, an attribute, an owner and an access permission. In the item of BOX name, the designation for the BOX is set. In the item of attribute, whether personal BOX or group BOX is set. In the item of owner, identification information of a user or a group assigned to the BOX is set. A group refers to a set of a plurality of users and is defined in the item of group information for each user in the aforementioned user management table. In the item of access permission, identification information of a user or a group permitted to access the BOX is set. Either a user ID or a group name may be set or both may be set. Access includes reading data stored in BOX and writing data into BOX. For each of reading and writing of data, a user ID or a group name may be set.

FIG. 11 is a diagram showing an exemplary meeting room management table. Meeting room management table 97 includes a meeting room record which defines association between a destination apparatus and a user recognition apparatus. The meeting room management table is created by inputting beforehand information about a destination apparatus and a user recognition apparatus into MFP 100 and is stored in HDD 116. Referring to FIG. 11, the meeting room management table includes meeting room records by the number of meeting rooms. The meeting room record includes the apparatus name of a destination apparatus, apparatus identification information of the destination apparatus, the apparatus name of a user recognition apparatus, and apparatus identification information of the user recognition apparatus. The apparatus identification information of a destination apparatus and the apparatus identification information of a user recognition apparatus are their location information in network 2 and here, IP (Internet Protocol) address is used. It is noted that the apparatus identification information may be MAC (Media Access Control) address.

The first meeting room record associates projector 200 having the apparatus name of the destination apparatus "projector A" with user recognition apparatus 300 having the apparatus name of the user recognition apparatus "reader A." Therefore, the first meeting room record relates projector 200 and user recognition apparatus 300 installed in meeting room A with each other. The second meeting room record associates projector 200A having the apparatus name of the destination apparatus "projector B" with user recognition apparatus 300A having the apparatus name of the user recognition apparatus "reader B." Therefore, the second meeting room record associates projector 200A and user recognition apparatus 300A installed in meeting room B with each other. The third meeting room record associates projector 200B having the apparatus name of the destination apparatus "projector C" with user recognition apparatus 300B having the apparatus name of the user recognition apparatus "reader C." Therefore, the third meeting room record associates projector 200B and user recognition apparatus 300B installed in meeting room C with each other.

Returning to FIG. 7, CPU 111 includes an authentication portion 51 for authenticating a user who operates MFP 100, a data designation acceptance portion 53 for accepting designation of data to be output, a destination acceptance portion 57 for accepting a destination of data to be output, a participant information obtaining portion 59 for obtaining participant information for each destination, an access permission determination portion 55 for determining whether access to data is permitted or not for each participant, an output permission determination portion 61 for determining whether data output is permitted or not for each destination, an image obtaining portion 69 for obtaining an image from whiteboard 400, a document image obtaining portion 73 for obtaining a document image output by image reading portion 20, a combination portion 71 for combining two images, an output portion 65 for outputting data to a destination based on a determination result by output permission determination portion 61, and a warning portion 67 for giving a warning based on a determination result by output permission determination portion 61.

Authentication portion 51 authenticates a user who operates MFP 100. When a user inputs the user ID and password to operation portion 115, authentication portion 51 accepts the user ID and password from operation portion 115. Furthermore, when MFP 100 is remotely operated by projector 200, data communication control portion 117 receives a user ID and a password from projector 200 and then authentication portion 51 accepts the user ID and password from data communication control portion 117. If a user record having the same pair as a pair of the accepted user ID and password is included in user management table 91, authentication portion 51 authenticates the user. If a user is authenticated, authentication portion 51 outputs the user ID of that user to access permission determination portion 55.

On the other hand, when a principal ID and a proxy ID are input from operation portion 115 or data communication control portion 117, authentication portion 51 then authenticates the user having the proxy ID, if a proxy authentication record including a pair of the principal ID and the proxy ID is included in proxy authentication table 93. Then, authentication portion 51 authenticates the user of the proxy ID as a proxy of the user of the principal ID on condition that authentication of the user of the proxy ID by the user ID and password is successful. Authentication portion 51 assumes that the user of the principal ID had logged in. In other words, the principal ID is output to access permission determination portion 55. Therefore, a BOX to which access right is not held by the user of the proxy ID but is held by the user of the principal ID can be accessed through the operation by the user of the proxy ID.

Data designation acceptance portion 53 accepts designation of data stored in HDD 116. When a user inputs a file name of data stored in HDD 116 to operation portion 115 or when a user inputs an operation of designating a file name of data displayed on display portion 114, the file name is accepted from operation portion 115. Furthermore, when MFP 100 is remotely operated by projector 200, data designation acceptance portion 53 transmits BOX information of BOX accessible by the user authenticated by authentication portion 51 to projector 200. BOX information includes a BOX name and a file name of data stored in the BOX. Then, when data communication control portion 117 receives the file name from projector 200, data designation acceptance portion 53 accepts the BOX name and the file name from data communication control portion 117. Data designation acceptance portion 53 outputs the accepted BOX name and file name to access permission determination portion 55.

Destination acceptance portion 57 accepts a destination of data. When a user inputs the apparatus name of a destination to operation portion 115 or when a user inputs an operation of designating any one of the apparatus names in a list of apparatus names displayed on display portion 114, the apparatus name of a destination is accepted from operation portion 115. Furthermore, when MFP 100 is remotely operated by projector 200, destination acceptance portion 57 transmits the list of apparatus names to projector 200. The list of apparatus names includes apparatus names defined in meeting room management table 97. Then, when data communication control portion 117 receives an apparatus name from projector 200, destination acceptance portion 57 accepts the apparatus name as a destination from data communication control portion 117. Destination acceptance portion 57 accepts the apparatus name and then outputs the apparatus identification information of the apparatus having the accepted apparatus name to participant information obtaining portion 59 and output portion 65.

Participant information obtaining portion 59 receives the apparatus identification information of the destination from destination acceptance portion 57 and then reads the meeting room management record including the apparatus identification information of the destination from meeting room management table 97 to obtain the apparatus identification information of the user recognition apparatus paired with the apparatus identification information of the destination. Then, participant information obtaining portion 59 transmits a transmission request for participant information to the user recognition apparatus identified by the obtained apparatus identification information, among user recognition apparatuses 300, 300A, 300B. Here, projector 200 is input as a destination, by way of example. Since the apparatus identification information of user recognition apparatus 300 is obtained from meeting room management table 97, the transmission request for participant information is transmitted to user recognition apparatus 300. Upon reception of the transmission request, user recognition apparatus 300 transmits the user ID stored in RAM to MFP 100, so that participant information obtaining portion 59 receives the user ID from user recognition apparatus 300. Participant information obtaining portion 59 outputs the received user ID to access permission determination portion 55. If a plurality of user IDs are received from user recognition apparatus 300, participant information obtaining portion 59 outputs all of the received plurality of user IDs to access permission determination portion 55.

Here, if a meeting reservation program is executed in server 500 (FIG. 1) and reservation information including meeting room and participant information is stored in server 500, participant information obtaining portion 59 may obtain the user ID of the participant for each meeting room from server 500.

Access permission determination portion 55 receives the user ID from participant information obtaining portion 59. When the BOX name and the file name are input from data designation acceptance portion 53, access permission determination portion 55 determines whether or not the user of the user ID input from participant information obtaining portion 59 can access the data having that file name. If a plurality of user IDs are input from participant information obtaining portion 59, whether access to data is allowed or not is determined for each of a plurality of user IDs. Access permission determination portion 55 determines whether access to data is allowed or not based on the access right to the BOX storing the data.

Specifically, access permission determination portion 55 reads a BOX management record including the BOX name input from data designation acceptance portion 53 from BOX management table 95 to obtain the user ID and the group name set in the item of access permission in the BOX management record. The user ID and the group name to which reading is permitted in the access permission are obtained. Access permission determination portion 55 determines that access is allowed, if the user ID identical to the user ID input from participant information obtaining portion 59 is set in the item of access permission in the BOX management record. Furthermore, access permission determination portion 55 determines that access is allowed, if the user ID identical to the user ID input from participant information obtaining portion 59 belongs to the group having the group name set in the item of access permission in the BOX management group.

In addition, when a document image is obtained by document image obtaining portion 73, access permission determination portion 55 determines whether or not the user of the user ID input from participant information obtaining portion 59 can access the document image output by document image obtaining portion 73, based on the relation between the user of the user ID input from authentication portion 51 and the user of the user ID input from participant information obtaining portion 59. If user IDs of a plurality of users are input from participant information obtaining portion 59, whether access to the document image is allowed or not is determined for each of a plurality of user IDs.

Specifically, when a document image is obtained by document image obtaining portion 73, access permission determination portion 55 reads from user management table 91 the user management record in which the user ID authenticated by authentication portion 51 is set in the item of user ID. Then, access permission determination portion 55 determines that access is allowed, if the user ID identical to the user ID input from participant information obtaining portion 59 belongs to the group having the group name set in the item of group information in the read user management record.

In addition, when a document image is obtained by document image obtaining portion 73, access permission determination portion 55 determines whether or not the user of the user ID input from participant information obtaining portion 59 can access the document image output by document image obtaining portion 73, based on information embedded in the document image. If users of a plurality of user IDs are input from participant information obtaining portion 59, whether access to the document image is allowed or not is determined for each of a plurality of users.

Specifically, when a document image is obtained by document image obtaining portion 73, access permission determination portion 55 extracts the user ID embedded in the document image. Then, access permission determination portion 55 determines that access is allowed, if the user ID identical to the user ID input from participant information obtaining portion 59 is extracted from the document image.

If determining that access is allowed, access permission determination portion 55 outputs a pair of the user ID input from participant information obtaining portion 59 and an access permission signal to output permission determination portion 61. If not determining that access is allowed, access permission determination portion 55 outputs a pair of the user ID input from participant information obtaining portion 59 and an access prohibition signal to output permission determination portion 61.

Output permission determination portion 61 determines whether to transmit data to a destination, based on a pair of the user ID input from access permission determination portion 55 and the access permission signal or a pair of the user ID and the access prohibition signal. Specifically, if all of a plurality of user IDs with the same destination are paired with the access permission signal, it is determined that output is allowed. If there exists a user ID paired with the access prohibition signal among a plurality of user IDs with the same destination, output permission determination portion 61 outputs a warning signal to warning portion 67. The warning signal includes the apparatus identification information of the destination apparatus.

Warning portion 67 displays the apparatus identification information of the destination and a message indicating that output is not allowed on display portion 114. Thus, the log-in user who is the operator of MFP 100 can know that an image of the designated data or the document read by image reading portion 20 cannot be displayed in one of projectors 200, 200A, 200B.

When a permission button provided on operation portion 115 is pressed, permission acceptance portion 63 accepts a permission signal from operation portion 115 and outputs the signal to output permission determination portion 61. Here, after accepting the permission signal, permission acceptance portion 63 may output a permission signal to output permission determination portion 61 on condition that authentication by authentication portion 51 is successful again. In this case, the user authenticated by authentication portion 51 may not be a log-in user as long as the user has the access right to the data to be output. Furthermore, permission acceptance portion 63 may receive a permission signal, a user ID and a password from any one of projectors 200, 200A, 200B. In this case, data can be output by permission of any one of the participants present in meeting room A, meeting room B or meeting room C.

If a permission signal is input from permission acceptance portion 63 after a warning signal is output to warning portion 67, output permission determination portion 61 determines that output is allowed. If a permission signal is not input, output permission determination portion 61 determines that output is not allowed. If determining that output is allowed, output permission determination portion 61 outputs an output permission signal to output portion 65. If determining that output is not allowed, output permission determination portion 61 outputs an output prohibition signal to output portion 65.

Here, if at least one of a plurality of user IDs with the same destination is paired with the access permission signal, it may be determined that output is allowed. In this case, if all of a plurality of user IDs with the same destination are paired with the access prohibition signal, output permission determination portion 61 outputs a warning signal to warning portion 67.

Document image obtaining portion 73 receives a document image output by image reading portion 20 reading a document. Document image obtaining portion 73 outputs the document image to combination portion 71.

Image obtaining portion 69 obtains an image from whiteboard 400 and outputs the obtained image to combination portion 71. When data communication control portion 117 receives the image from whiteboard 400, image obtaining portion 69 accepts the image from data communication control portion 117.

Combination portion 71 receives the image from image obtaining portion 69. If designation of data is accepted by data designation acceptance portion 53, combination portion 71 reads the designated data from BOX 99 of HDD 116 and generates a combination image formed by combining an image of the read data with the image. On the other hand, if a document image is input from document image obtaining portion 73, combination portion 71 generates a combination image formed by combining the document image with the image. Combination portion 71 outputs the combination image to output portion 65.

Output portion 65 receives the output permission signal from output permission determination portion 61 to transmit data to a destination projector specified by the apparatus identification information input from destination acceptance portion 57. If designation of data is accepted by data designation acceptance potion 53, output portion 65 reads the designated data from BOX 99 of HDD 116. Then, the read data is transmitted to the destination through data communication control portion 117. On the other hand, if an image is obtained by image obtaining portion 69, the combination image input from combination portion 71 is transmitted to the destination through data communication control portion 117.

If a document image is obtained by document image obtaining portion 73, output portion 65 transmits the document image obtained by document image obtaining portion 73 to the destination through data communication control portion 117. If an image is obtained by image obtaining portion 69, the combination image input from combination portion 71 is transmitted to the destination through data communication control portion 117.

On the other hand, if the output prohibition signal is input from output permission determination portion 61, output portion 65 reads a prohibition image stored beforehand in HDD 116 and outputs the prohibition image to the destination. An example of the prohibition image is shown in FIG. 12. The prohibition window includes a character string "Viewing Not Available." Therefore, in one of projectors 200, 200A, 200B that is prohibited to output data, the prohibition window is projected, so that the participants in the meeting room cannot see the image of the data. Therefore, leakage of confidential information can be prevented.

In addition, output portion 65 may receive the output prohibition signal after receiving the output permission signal from output permission determination portion 61 and transmitting data to a destination. For example, a participant who enters meeting room B during the session does not have access right. In this case, the user ID of the participant who enters during the session is transmitted from user recognition apparatus 300A installed in meeting room B to MFP 100. When the user ID is obtained by participant information obtaining portion 59, access permission determination portion 55 determines that access is not allowed and thereafter output permission determination portion 61 determines that output is not allowed. In this case, output portion 65 receives the output prohibition signal from output permission determination portion 61, so that the prohibition image stored beforehand in HDD 116 is output to the destination. In the destination projectors 200, 200A, 200B, the prohibition image appears thereby avoiding a state in which the image previously displayed stay displayed. Therefore, leakage of confidential information can be prevented.

Figure 13:
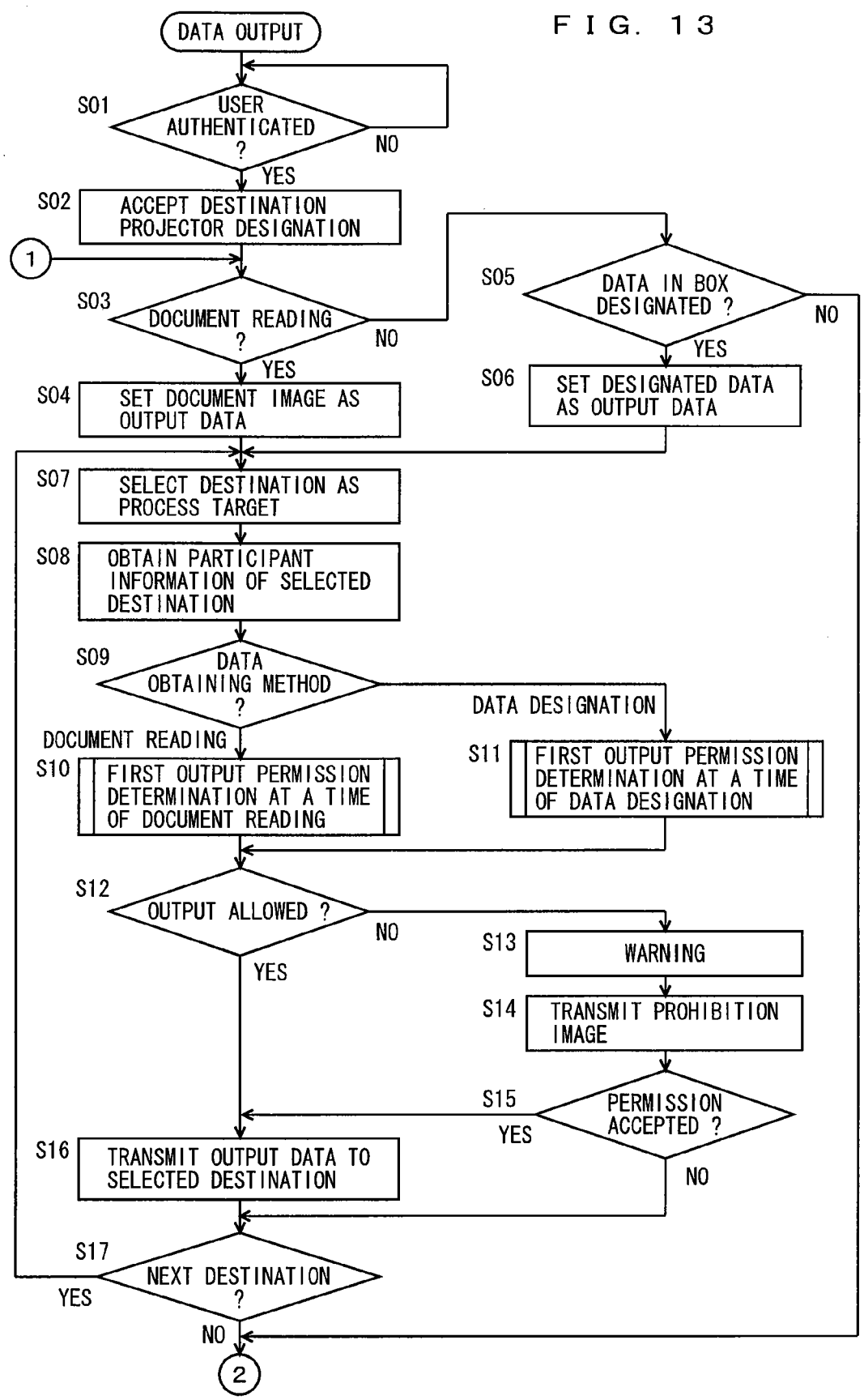
FIG. 13 is a first flowchart showing an exemplary flow of a data output process.
Figure 14:
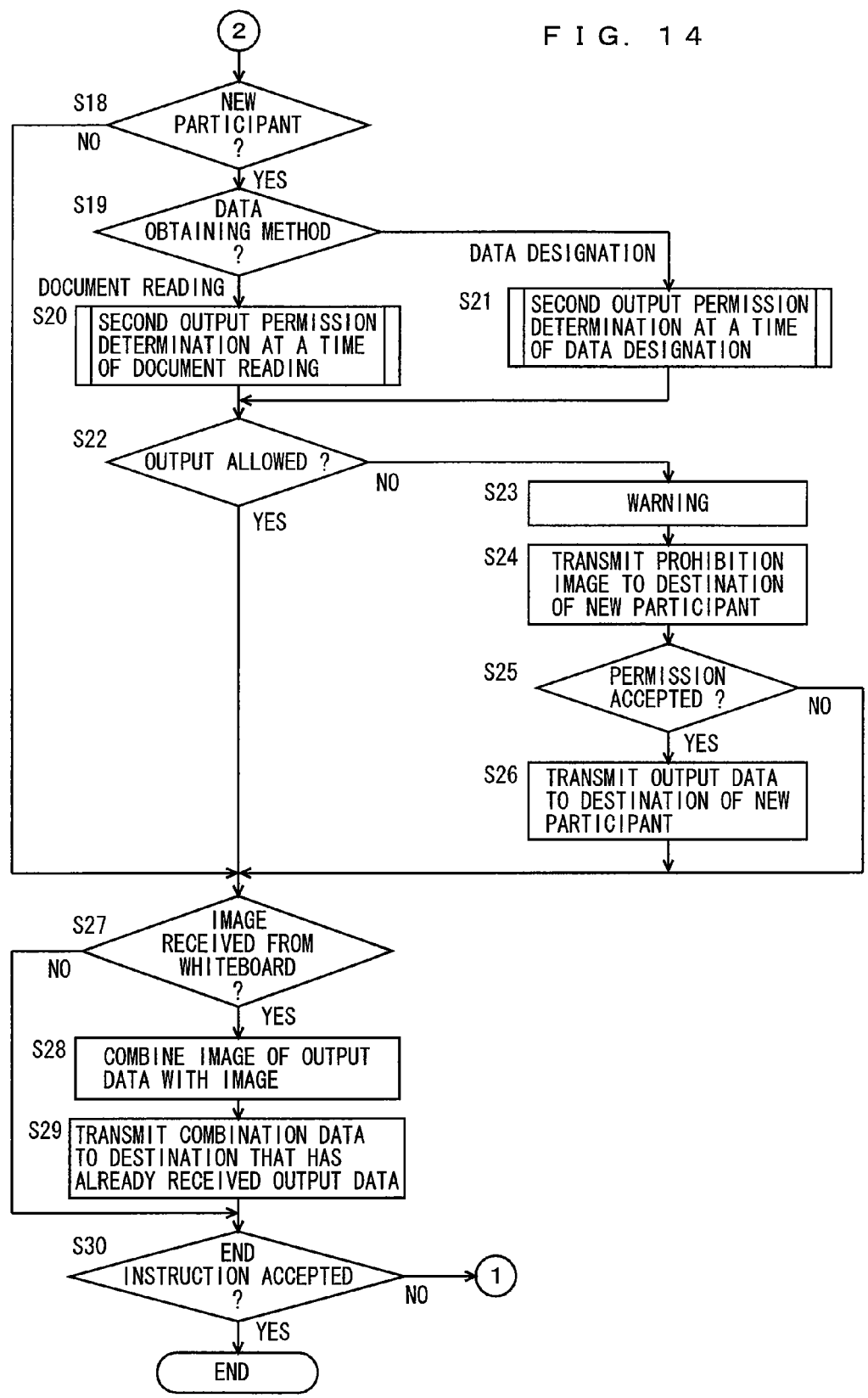
FIG. 14 is a second flowchart showing an exemplary flow of the data output process.

FIG. 13 and FIG. 14 are flowcharts showing an exemplary flow of a data output process. The data output process is a process performed by CPU 111 executing a data output program stored in EEPROM 113. Referring to FIG. 13 and FIG. 14, CPU 111 determines whether or not user authentication is successful (step S01). The process stands by until user authentication is successful, and if user authentication is successful, the process proceeds to step S02. Here, in a case where user authentication using a proxy ID is successful, it is assumed that user authentication by a principal ID is successful, and the process proceeds to step S02.

In step S02, designation of a destination projector is accepted. Specifically, meeting room management table 97 is read, and the apparatus names set in the item of apparatus name of the destination apparatus are listed on display portion 114 so that designation of one or more apparatus names is accepted. The apparatus having the designated apparatus name is set as a destination. Here, the apparatus names of projectors 200, 200A, 200B are designated, and projectors 200, 200A, 200B are set as destinations, by way of example.

In step S03, it is determined whether or not document reading is executed. If image reading portion 20 is enabled and a document image is read, the process proceeds to step S04. If not, the process proceeds to step S05. In step S04, the document image is set as output data, and the process proceeds to step S07. In step S05, it is determined whether or not data in BOX is designated. If data in BOX is designated, the process proceeds to step S06, and if not, the process proceeds to step S18. In step S06, the data designated in step S05 is set as output data, and the process proceeds to step S07.

In step S07, one of one or more apparatuses set as destinations in step S02 is selected as a process target. The apparatus selected as a process target will be referred to as a selected destination hereinafter. In step S08, participant information of the selected destination is obtained. The participant information is obtained from one of user recognition apparatuses 300, 300A, 300B that is installed in the meeting room having the selected destination installed therein. Therefore, CPU 111 reads the meeting room management record including the apparatus identification information of the selected destination from meeting room management table 97 and obtains the apparatus identification information of the user recognition apparatus paired with the apparatus identification information of the selected destination.

Projector 200 is selected as a selected destination, by way of illustration. CPU 111 obtains the apparatus identification information of user recognition apparatus 300 from meeting room management table 97. CPU 111 transmits a transmission request for participant information to user recognition apparatus 300. Upon reception of the transmission request, user recognition apparatus 300 transmits user ID stored in RAM as participant information to MFP 100, so that CPU 111 receives the participant information (user ID) from user recognition apparatus 300.

In step S09, the process branches depending on a data obtaining method. If a document image is obtained as output data by image reading portion 20 reading a document (YES in step S03), the process proceeds to step S10. If data read from BOX is obtained as output data by a user designating data stored in BOX of HDD 116 on operation portion 115 (YES in step S05), the process proceeds to step S11.

In step S10, a first output permission determination process at a time of document reading is performed, and the process proceeds to step S12. On the other hand, in step S11, a first output permission determination process at a time of data designation is performed, and the process proceeds to step S12. The first output permission determination process at a time of document reading and the first output permission determination process at a time of data designation, which are described later, are the process of determining whether or not data set as output data can be output to a destination in step S04 or step S06, based on the participant information obtained in step S08.

In step S12, it is determined whether or not that output is allowed is determined, as a result of the first output permission determination process at a time of document reading or the first output permission determination process at a time of data designation. If output is allowed, the process proceeds to step S16, and if not, the process proceeds to step S13.

In step S13, a warning is given. Specifically, the apparatus name of the selected destination and a message (warning message) indicating that data cannot be output appear on display portion 114. Here, in place of the apparatus name of the selected destination, the location where the apparatus as the selected destination is installed may be shown. For example, if the selected destination is projector 200, the designation of meeting room A in which projector 200 is installed is displayed in place of the apparatus name of projector 200. Thus, the operator of MFP 100 can know that the data obtained by reading a document or the data designated from the data stored in HDD 116 cannot be output in the projector of the selected destination. Here, if MFP 100 is remotely operated by any one of projectors 200, 200A, 200B, the apparatus name of the selected destination and the warning message are transmitted to the one of projectors 200, 200A, 200B that remotely controls.

In step S14, the prohibition image is transmitted to the selected destination, and the process proceeds to step S15. Specifically, the prohibition image shown in FIG. 12 is transmitted. For example, in a case where the selected destination is projector 200, projector 200 projects the prohibition image so that the participant in the meeting room A sees the prohibition image and cannot see the image of the output data. Therefore, a person who does not have access right to the output data is not allowed to see the image of the output data, thereby preventing leakage of confidential information included in the output data.

In step S15, it is determined whether or not permission is accepted. If permission is accepted, the process proceeds to step S16, and if not, the process proceeds to step S17. When a permission button provided on operation portion 115 is pressed, CPU 111 accepts permission. Here, permission may be accepted on condition that after the permission button is pressed, user authentication is successful again. In this case, the authenticated user may not be a log-in user who operates MFP 100 as long as the user has access right to the output data.

If MFP 100 is remotely operated by any of projectors 200, 200A, 200B, permission may be accepted on condition that a permission signal, a user ID and a password are received from one of projectors 200, 200A, 200B that remotely operates and user authentication is successful with the received user ID and password. In this case, the output data can be output by permission of any one of the participants present in meeting room A, meeting room B or meeting room C.

In step S16, the output data is transmitted to the selected destination. Thus, the selected destination of projectors 200, 200A, 200B projects the image of the output data. Therefore, the participant in the meeting room in which the selected destination is installed can see the image of the output data.

In the next step S17, it is determined whether or not the one that has not been selected as the selected destination exists among those of projectors 200, 200A, 200B that are designated as destinations in step S02. If such destination exists, the process returns to step S07, and if not, the process proceeds to step S18.

In step S18, it is determined whether or not any new participant exists. If a new participant exists, the process proceeds to step S19, and if not, the process proceeds to step S27. Specifically, a transmission request for participant information is transmitted to each of user recognition apparatuses 300, 300A, 300B and then the participant information is received. Then, the received participant information is compared with the participant information obtained in the previous step S08, and if the participant information that does not exist in the participant information obtained in the previous step S08 exists in the received participant information, the participant of that participant information is determined as a new participant.

In step S19, the process branches depending on the data obtaining method. If a document image is obtained as output data by image reading portion 20 reading a document (YES in step S03), the process proceeds to step S20. If data read from BOX is obtained as output data by a user designating data stored in BOX of HDD 116 on operation portion 115 (YES in step S05), the process proceeds to step S21.

In step S20, a second output permission determination process at a time of document reading is performed, and the process proceeds to step S22. On the other hand, in step S21, a second output permission determination process at a time of data designation is performed, and the process proceeds to step S22. The second output permission determination process at a time of document reading and the second output permission determination process at a time of data designation, which will be described later, are the process of determining whether or not data set as output data in step S04 or step S06 is allowed to be output, based on the participant information of the new participant.

In step S22, it is determined whether or not that output is allowed is determined as a result of the second output permission determination process at a time of document reading or the second output permission determination process at a time of data designation. If output is allowed, the process proceeds to step S27, and if not, the process proceeds to step S23.

In step S23, a warning is given. Specifically, shown on display portion 114 are the apparatus name of one of projectors 200, 200A, 200B that is installed in the meeting room where a new participant participates and a message (warning message) indicating that data cannot be output. Thus, the operator of MFP 100 can know that the image of the data obtained by reading a document or the data designated from data stored in HDD 116 is not displayed in the meeting room where the new participant participates. Here, among meeting rooms A, B, C, the meeting room where the new participant participates may be displayed.

In step S24, the prohibition image is transmitted to one of projectors 200, 200A, 200B that is installed in the meeting room where the new participant participates, and the process proceeds to step S25. Specifically, the prohibition image shown in FIG. 12 is transmitted. For example, when a new participant joins in meeting room B, the prohibition image is transmitted to projector 200A. Therefore, the new participant sees the prohibition image and cannot see the image of the output data. A new participant who does not have access right to the output data is not allowed to see the image of the output data, thereby preventing leakage of confidential information included in the output data.

In step S25, it is determined whether or not permission is accepted, similarly to step S15. If permission is accepted, the process proceeds to step S26, and if not, the process proceeds to step S27. In step S26, the output data is transmitted to one of projectors 200, 200A, 200B that is installed in the meeting room where the new participant participates. Thus, the one of projectors 200, 200A, 200B that is installed in the meeting room where the new participant participates projects the image of the output data. Therefore, the new participant can see the image of the output data.

In step S27, it is determined whether or not an image is received from whiteboard 400. When the user presses a reading instruction button provided on operation panel 405 of whiteboard 400, whiteboard 400 transmits the image obtained by scanner 403 reading an image drawn on the board surface, to MFP 100. When data communication control portion 117 receives the image from whiteboard 400, CPU 111 proceeds to step S28, and if not, the process proceeds to step S30.

In step S28, combination data is generated by combining the image of the data set as output data in step S04 or step S06 with the image received in step S27. Then, the combination data is transmitted to all the destinations to which the output data has already been output (step S29). For example, the output data has been transmitted to all of projectors 200, 200A, 200B in step S16, by way of illustration. The image formed by combining the document image read by image reading portion 20 or the image of data designated by the operator among data stored in HDD 116 with the image drawn on the board surface of whiteboard 400 is projected by each of projectors 200, 200A, 200B. Therefore, in each of meeting room A, meeting room B and meeting room C, the image drawn on the board surface of whiteboard 400 is displayed.

In step S30, it is determined whether or not an end instruction is accepted. If an end key provided on operation portion 115 is pressed, the process ends, and if the end key is not pressed, the process returns to step S03.

Figure 15:
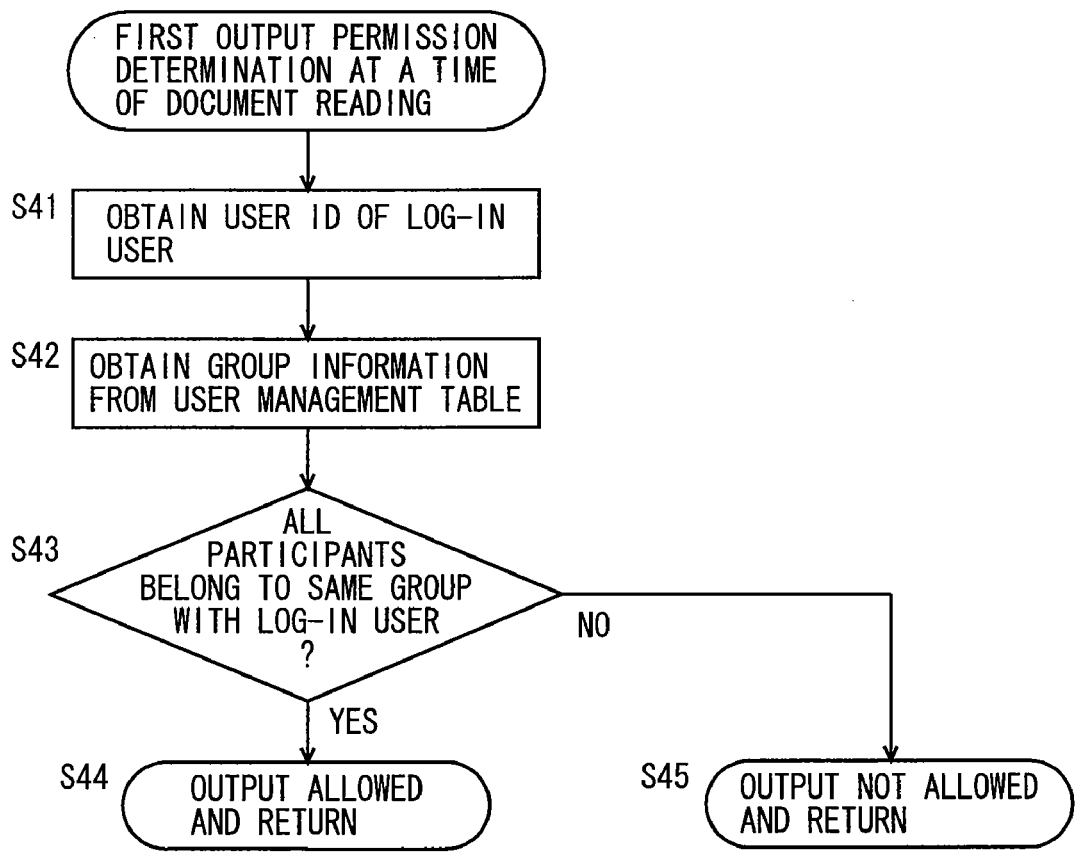
FIG. 15 is a flowchart showing an exemplary flow of a first output permission determination process at a time of document reading.

FIG. 15 is a flowchart showing an exemplary flow of the first output permission determination process at a time of document reading. The first output permission determination process at a time of document reading is a process executed in step S10 in FIG. 13. Referring to FIG. 15, CPU 111 obtains the user ID of the log-in user (step S41). The log-in user is the user authenticated in step S01 in FIG. 13. Here, in a case of proxy authentication, although the log-in user has a proxy ID, the principal ID is obtained as the user ID of the log-in user.

Then, group information is obtained from the user management table (step S42). Specifically, the user management record including the user ID of the log-in user is read from user management table 91 stored in HDD 116, and the set value in the item of group information of the read user management record is obtained.

Next, it is determined whether or not all the participants belong to the same group with the log-in user (step S43). If all the participants belong to the same group with the log-in user, the process proceeds to step S44, and if not, the process proceeds to step S45. Specifically, the user management records each including participant information of the selected destination, which is obtained in step S08 in FIG. 13, are read from user management table 91, and the set values in the item of group information are obtained. If all of the obtained set values in the group information are identical to the set value obtained in step S42, it is determined that all the participants belong to the same group with the log-in user. In other words, if all of the participants belong to the same group with the log-in user, it is determined that the output data can be output.

In step S44, the return value is set to allow output, and the process returns to the data output process. In step S45, the return value is set not to allow output, and the process returns to the data output process.

Although it is determined whether or not all participants belong to the same group with the log-in user in step S43, it may be determined whether or not any one of all participants belongs to the same group with the log-in user. In this case, if any one of all participants belongs to the same group with the log-in user, the process proceeds to step S44, and if none of the participants belong to the same group with the log-in user, the process proceeds to step S45.

Figure 16:
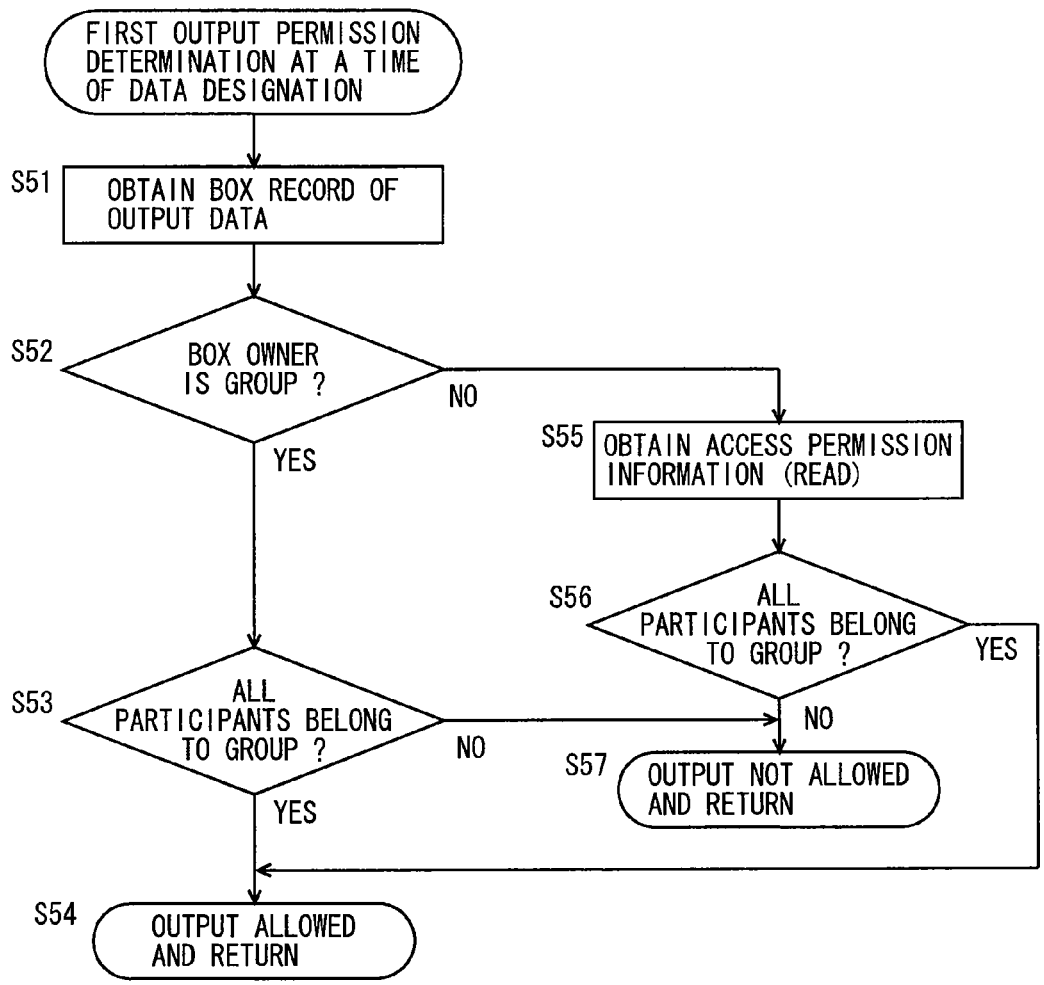
FIG. 16 is a flowchart showing an exemplary flow of a first output permission determination process at a time of data designation.

FIG. 16 is a flowchart showing an exemplary flow of the first output permission determination process at a time of data designation. The first output permission determination process at a time of data designation is a process executed in step S11 in FIG. 13. Referring to FIG. 16, the BOX management record of the BOX in which data designated as output data in step S06 in FIG. 13 is stored is obtained (step S51). Specifically, the BOX management record including the BOX name of the BOX in which output data is stored is read from BOX management table 95 stored in HDD 116.

Then, it is determined whether or not the owner of the BOX is a group (step S52). Specifically, it is determined whether or not a group name is set in the item of owner of the BOX management record obtained in step S51. If a group name is set, the group is temporarily stored as a group allowed for output, and the process proceeds to step S53, and if not, the process proceeds to step S55.

In step S53, it is determined whether or not all participants belong to the group. If all participants belong to the group, the process proceeds to step S54, and if not, the process proceeds to step S57. Specifically, the user management records each including the participant information of the selected destination, which is obtained in step S08 in FIG. 13, are read from user management table 91, and the set values in the item of group information are obtained. If all of the obtained set values in the item of group information are identical to the group temporarily stored as a group allowed for output in step S52, it is determined that all participants belong to the group. In other words, if all of the participants are the owners of BOX in which output data is stored, it is determined that the output data can be output.

In step S54, the return value is set to allow output, and the process returns to the data output process. In step S57, the return value is set not to allow output, and the process returns to the data output process.

On the other hand, in step S55, the set value in the item of access permission of the BOX management record obtained in step S51 is obtained. Then, the group set as the set value in the item of access permission is temporarily stored as a group allowed for output, and the process proceeds to step S56.

In step S56, it is determined whether or not all participants belong to the group. If all participants belong to the group, the process proceeds to step S54, and if not, the process proceeds to step S57. Specifically, the user management records each including the participant information of the selected destination, which is obtained in step S08 in FIG. 13, are read from user management table 91, and the set values in the item of group information are obtained. If all of the obtained set values in the group information are identical to the group temporarily stored as a group allowed for output in step S55, it is determined that all participants belong to the group. In other words, if all of the participants can access the BOX in which the output data is stored, it is determined that the output data can be output.

In step S54, the return value is set to allow output, and the process returns to the data output process. In step S57, the return value is set not to allow output, and the process returns to the data output process.

Figure 17:
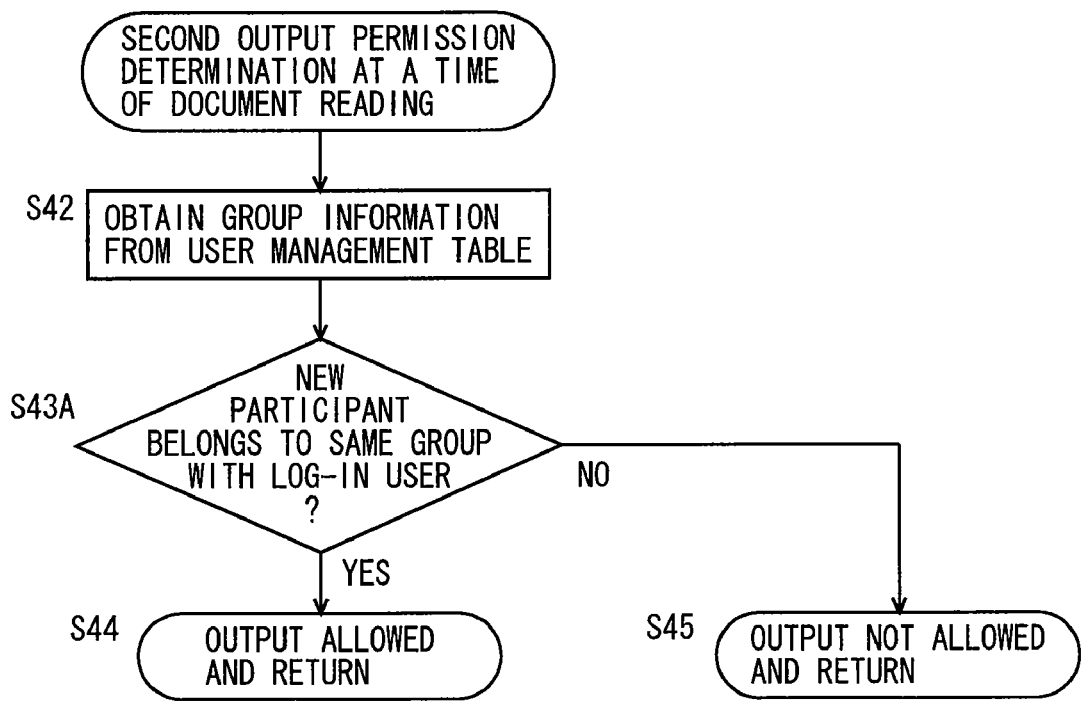
FIG. 17 is a flowchart showing an exemplary flow of a second output permission determination process at a time of document reading.

FIG. 17 is a flowchart showing an exemplary flow of the second output permission determination process at a time of document reading. The second output permission determination process at a time of document reading is a process executed in step S20 in FIG. 14. Referring to FIG. 17, the second output permission determination process at a time of document reading differs from the first output permission determination process at a time of document reading shown in FIG. 15 in that step S41 is deleted and step S43A is changed. The other processes are the same and therefore the description will not be repeated here.

Referring to FIG. 17, it is determined whether or not the new participant belongs to the same group with the log-in user (step S43A). If the new participant belongs to the same group with the log-in user, the process proceeds to step S44, and if not, the process proceeds to step S45. Specifically, the user management record including participant information of the new participant, which is obtained in step S18 in FIG. 14, is read from user management table 91, and the set value in the item of group information of the user management record is obtained. If the obtained set value of the group information is identical to the set value obtained in step S42, it is determined that the new participant belongs to the same group with the log-in user. In other words, if the new participant belongs to the same group with the log-in user, it is determined that the output data can be output.

FIG. 18 is a flowchart showing an exemplary flow of the second output permission determination process at a time of data designation. The second output permission determination process at a time of data designation is a process executed in step S21 in FIG. 14. Referring to FIG. 18, the second output permission determination process at a time of data designation differs from the first output permission determination process at a time of data designation shown in FIG. 16 in that step S53A and step S56A are changed. The other processes are the same and therefore the description will not be repeated here.

In step S53A, it is determined whether or not the new participant belongs to a group. If the new participant belongs to a group, the process proceeds to step S54, and if not, the process proceeds to step S57. Specifically, the user management record including the participant information of the new participant, which is obtained in step S18 in FIG. 14, is read from user management table 91, and the set value in the item of group information of the user management record is obtained. If the obtained set value of the group information is identical to the group temporarily stored as a group allowed for output in step S52, it is determined that the new participant belongs to the group. In other words, if the new participant is the owner of the BOX in which the output data is stored, it is determined that the output data can be output.

In step S56A, it is determined whether or not the new participant belongs to a group. If the new participant belongs to a group, the process proceeds to step S54, and if not, the process proceeds to step S57. Specifically, the user management record including participant information of the new participant, which is obtained in step S18 in FIG. 14, is read from user management table 91, and the set value in the item of group information of the user management record is obtained. If the obtained set value of the group information is identical to the group temporarily stored as a group allowed for output in step S55, it is determined that the new participant belongs to the group. In other words, if the new participant can access the BOX in which the output data is stored, it is determined that the output data can be output.

<Processing in Remote Operation>

Next, a process performed in MFP 100 when MFP 100 is remotely operated by any one of projectors 200, 200A, 200B will be described. Here, MFP 100 is remotely operated by projector 200, by way of illustration, and the process performed in each of MFP 100 and projector 200 will be described.

Figure 19:
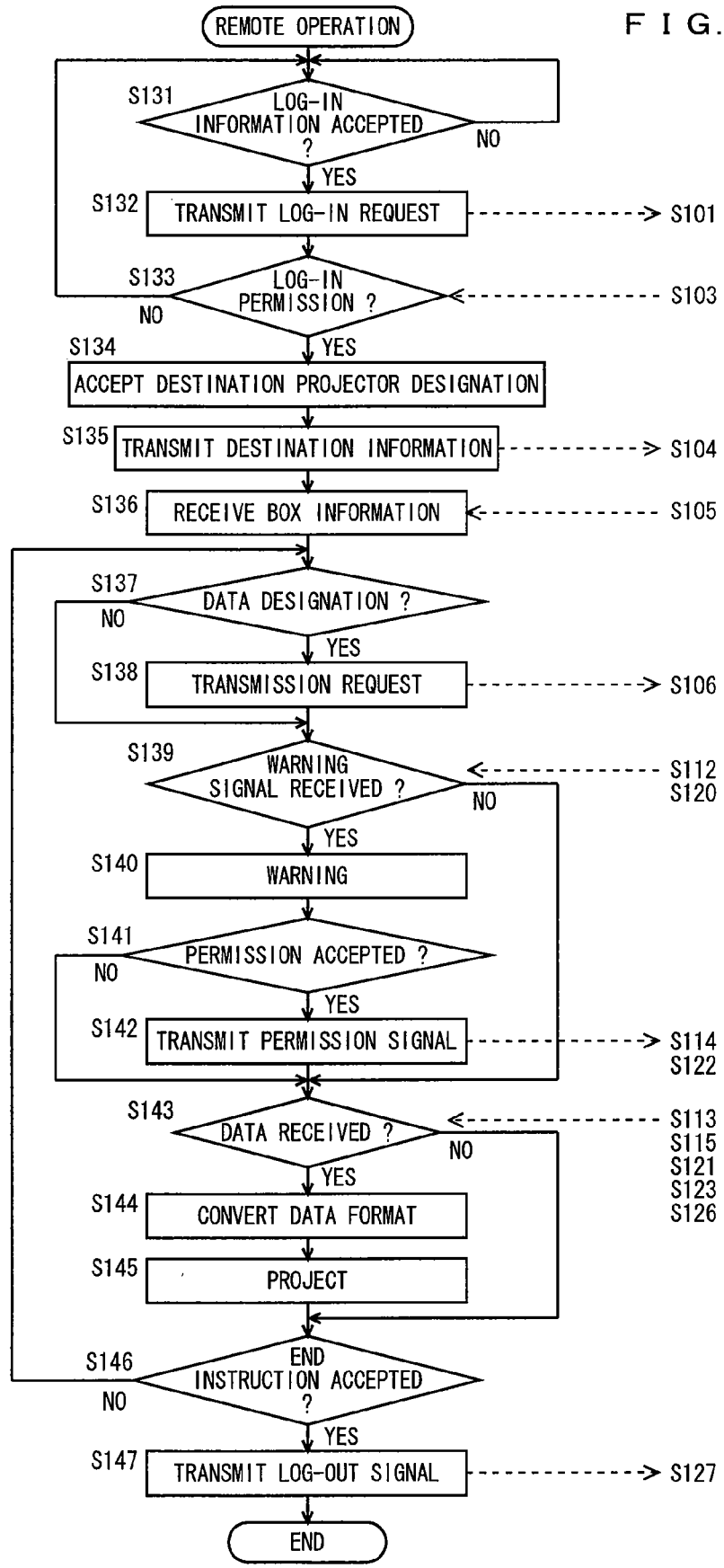
FIG. 19 is a flowchart showing an exemplary flow of a remote operation process.

FIG. 19 is a flowchart showing an exemplary flow of a remote operation process. The remote operation process is a process performed by CPU of control portion 201 included in projector 200 executing a remote operation program stored in ROM.

Referring to FIG. 19, CPU of control portion 201 included in projector 200 determines whether or not log-in information is accepted (step S131). When a user enters log-in information to operation panel 205, the log-in information is accepted from operation panel 205. The log-in information includes a user ID and a password. In the case of proxy authentication, the log-in information includes a principal ID, a proxy ID and a password. The process stands by until log-in information is accepted (NO in step S131), and when log-in information is accepted (YES in step S131), the process proceeds to step S132. In step S132, a log-in request including the log-in information accepted in step S131 is transmitted to MFP 100.

In MFP 100, user authentication is performed based on the log-in information, and when authentication is successful, a signal indicating a log-in permission is sent back to projector 200 which has transmitted the log-in request. In step S133, it is determined whether or not the signal indicating log-in permission is received. If the signal to permit log-in is received, the process proceeds to step S134. If not, the process returns to step S131.

In step S134, designation of a destination projector is accepted. Specifically, an input of apparatus identification information of at least one of projectors 200, 200A, 200B is accepted. Then, the destination information is transmitted to MFP 100 (step S135). The destination information includes the apparatus identification information of the destination accepted in step S134. Here, the apparatus identification information of projectors 200, 200A, 200B is input, and projectors 200, 200A, 200B are designated as destinations, by way of illustration. In this case, the destination information includes the respective apparatus identification information of projectors 200, 200A, 200B.

In step S136, BOX information is received from MFP 100. The BOX information includes the name of the BOX in HDD 116 of MFP 100 and the file name of data stored in the BOX. Then, in step S137, it is determined whether or not data is designated. Specifically, the BOX information is displayed on the liquid crystal display of operation panel 205, and it is determined whether or not one of the displayed file names is designated. If a file name is designated, it is determined that data is designated. If data is designated, the designated data is set as output data, and the process proceeds to step S138. If data is not designated, the process proceeds to step S139.

In step S138, a transmission request is transmitted to MFP 100. The transmission request includes the file name of the data designated in step S137 and the name of the BOX in which that data is stored. As described later, upon reception of the transmission request, MFP 100 sends back the data having the file name included in the transmission request or a warning signal. The warning signal includes the apparatus name of a destination to which the output data cannot be output and a message indicating that data cannot be output.

In step S139, it is determined whether or not a warning signal is received. If network I/F 207 receives a warning signal from MFP 100, the process proceeds to step S140, and if not, the process proceeds to step S143. In step S140, a warning is given. The apparatus name of the destination to which the output data cannot be output and the message indicating that data cannot be output, which are included in the warning signal, appear on the liquid crystal display of operation panel 205. Thus, the operator of projector 200 can know the meeting room in which the image of the designated data is not displayed.

In step S141, it is determined whether or not permission is accepted. If permission is accepted, the process proceeds to step S142, and if not, the process proceeds to step S143. When a permission button provided on operation panel 205 is pressed, permission is accepted. In step S142, a permission signal is transmitted. Here, in order to allow only the authorized user to give permission, the log-in information accepted in step S131 may be included in the permission signal. In this case, in MFP 100, permission is accepted only when user authentication is successful.

In step S143, it is determined whether or not data is received. If network I/F 207 receives data from MFP 100, the process proceeds to step S144, and if not, the process proceeds to step S146. In step S144, the format of the received data is converted. The format is a format defined beforehand for projection portion 203 by projector 200. Then, the data with the converted format is output to projection portion 203 so that the data is projected (step S145).

Then, in step S146, it is determined whether or not an end instruction is accepted. When a user presses an end key provided on operation panel 205, an end instruction is accepted from operation panel 205. If the end instruction is accepted, the process proceeds to step S147, and if not, the process returns to step S137. In step S147, a log-out signal is transmitted to MFP 100, and the process then ends.

Figure 20:
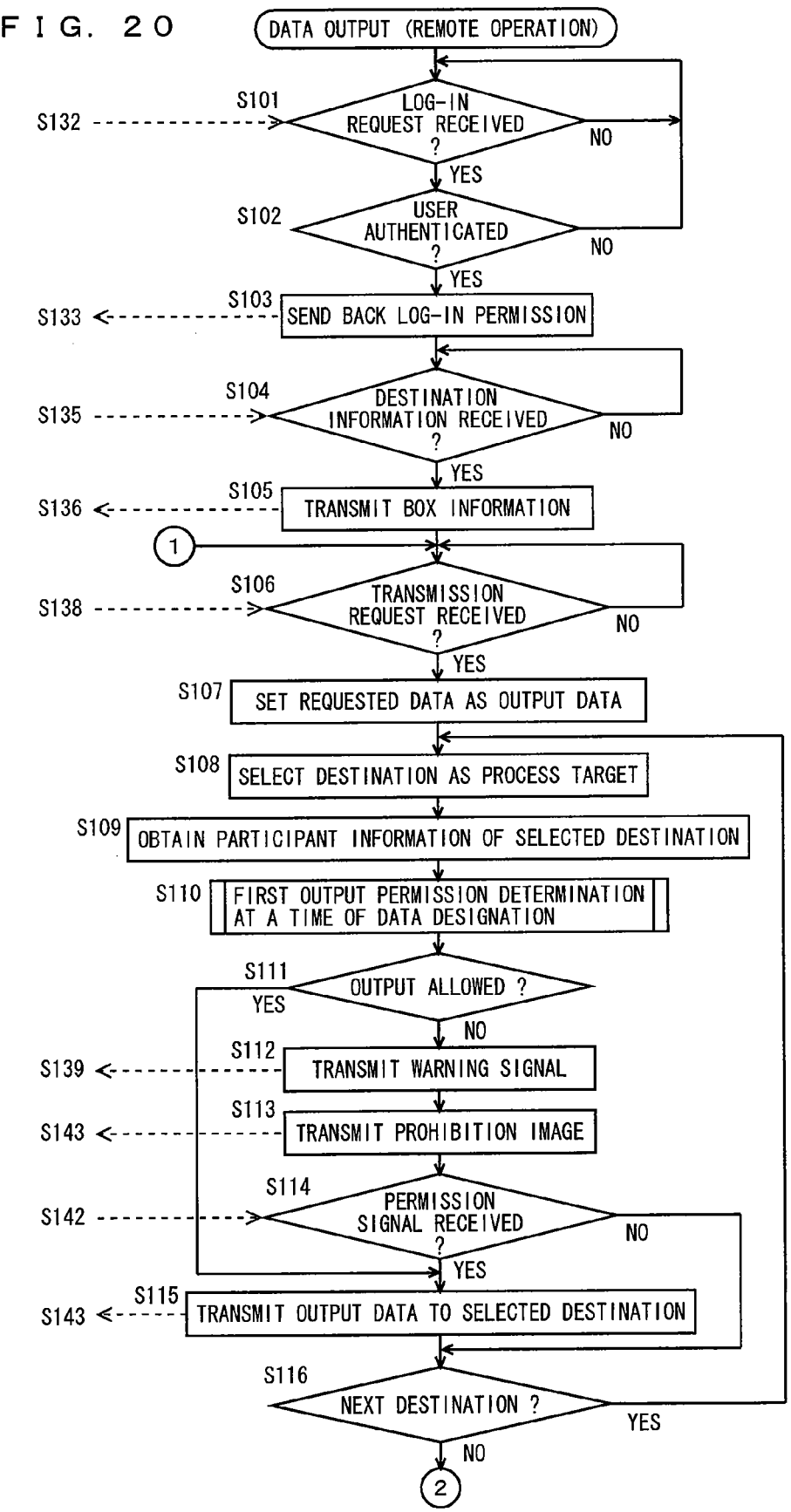
FIG. 20 and FIG. 21 are flowcharts showing an exemplary flow of a data output process at a time of remote operation.
Figure 21:
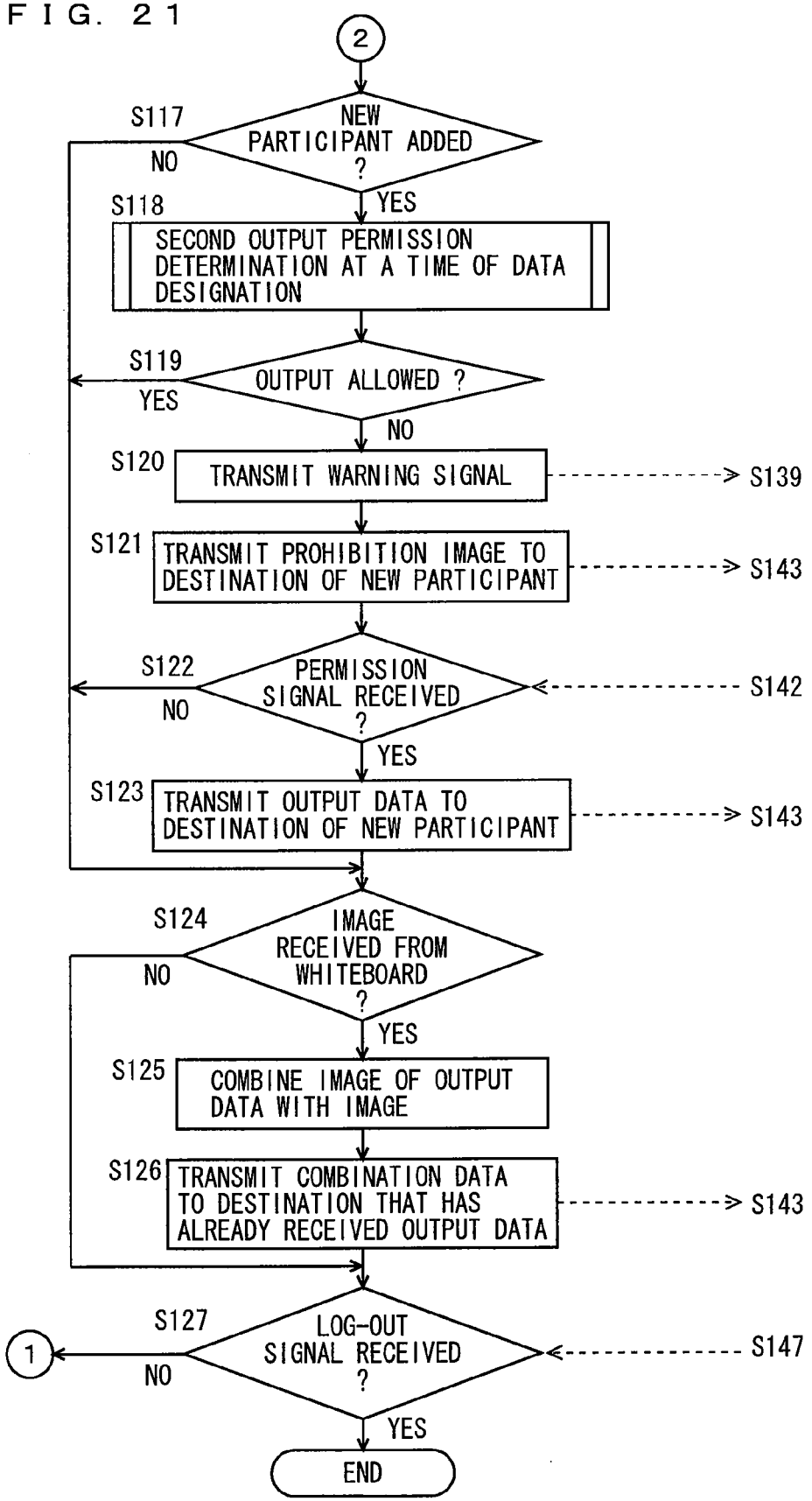

FIG. 20 and FIG. 21 are flowcharts showing an exemplary flow of a data output process at a time of remote operation. The data output process at a time of remote operation is a process performed by CPU 111 of MFP 100 executing a data output program stored in EEPROM 113. Referring to FIG. 20 and FIG. 21, CPU 111 determines whether or not a log-in request is received (step S101). It is determined whether or not data communication control portion 117 receives a log-in request from projector 200. The process stands by until a log-in request is received (NO in step S101), and if a log-in request is received, the process proceeds to step S102. In step S102, it is determined whether or not user authentication is successful. If user authentication is successful, the process proceeds to step S103, and if not, the process returns to step S101. Here, if the log-in request includes a principal ID and a proxy ID and a password, user authentication by the proxy ID is performed. Then, if user authentication by the proxy ID is successful, assuming that user authentication by the principal ID is successful, the process proceeds to step S103. In step S103, a signal indicating log-in permission is sent back to the apparatus that has transmitted the log-in request, here, to projector 200.

In the next step S104, the process stands by until destination information is received (NO in step S104), and if destination information is received, the process proceeds to step S105. The destination information includes the apparatus identification information of the destination. Here, the destination information includes the respective apparatus identification information of projectors 200, 200A, 200B, by way of illustration.

In step S105, BOX information is transmitted. Specifically, the BOX information including the name of the BOX in HDD 116 and the file name of the data stored in the BOX is transmitted to projector 200. Then, the process stands by until a transmission request is received (step S106), and if a transmission request is received, the process proceeds to step S107. The transmission request includes the file name of data and the name of the BOX in which that data is stored.

In step S107, data with the BOX name and the file name included in the transmission request is set as output data, and the process proceeds to step S108. In step S108, one of the apparatus identification information included in the destination information received in step S104 is selected as a process target. The apparatus selected as a process target will be referred to as a selected destination hereinafter.

In step S109, similar to step S08 in FIG. 13, the participant information of the selected destination is obtained. In the next step S110, the first output permission determination process at a time of data designation shown in FIG. 16 is performed, and the process proceeds to step S111. In step S111, it is determined whether or not that output is allowed is determined as a result of the first output permission determination process at a time of data designation. If output is allowed, the process proceeds to step S115, and if not, the process proceeds to step S112. In step S112, a warning signal is transmitted to projector 200. The warning signal includes the apparatus name of the selected destination and a message indicating that data cannot be output. Here, the name of the meeting room in which the apparatus as the selected destination is installed may be included in place of the apparatus name of the selected destination. For example, if the selected destination is projector 200, the name of meeting room A in which projector 200 is installed is included in place of the apparatus name of projector 200.

In step S113, the prohibition image is transmitted to the selected destination, and the process proceeds to step S114. Specifically, the prohibition image shown in FIG. 12 is transmitted. For example, if the selected destination is projector 200, projector 200 receives the prohibition image (step S143) and projects the same (step S145), so that the participant present in meeting room A sees the prohibition image and cannot see the image of the output data. Therefore, a person who does not have access right to the output data is not allowed to see the image of the output data, thereby preventing leakage of confidential information included in the output data.

In step S114, it is determined whether or not a permission signal is received from projector 200. If a permission signal is received, the process proceeds to step S115, and if not, the process proceeds to step S116. Here, if log-in information is included in the permission signal in order to allow only an authorized user to give permission, authentication is performed based on the log-in information. In this case, if authentication is successful, the process proceeds to step S115, and if not successful, the process proceeds to step S116.

In step S115, the output data is transmitted to the selected destination. Thus, of projectors 200, 200A, 200B, the selected destination projects the image of the output image. Therefore, the participant in the meeting room in which the selected destination is installed can see the image of the output data.

In the next step S116, it is determined whether or not the one that has not been selected as the selected destination exists among those of projectors 200, 200A, 200B that are designated as destinations in step S104. If such destination exits, the process returns to step S108, and if not, the process proceeds to step S117.

In step S117, similar to step S18 in FIG. 14, it is determined whether or not there exists a new participant. If a new participant exists, the process proceeds to step S118, and if not, the process proceeds to step S124.

In step S118, the second output permission determination process at a time of data designation shown in FIG. 18 is performed, and the process proceeds to step S119. In step S119, it is determined whether or not that output is allowed is determined as a result of the second output permission determination process at a time of data designation. If output is allowed, the process proceeds to step S124, and if not, the process proceeds to step S120.

In step S120, a warning signal is transmitted. Specifically, a warning signal including the apparatus name of one of projectors 200, 200A, 200B that is installed in the meeting room where the new participant participates and a message indicating that data cannot be output is transmitted to projector 200. Thus, the operator of projector 200 can know that the image of the data designated from the data stored in HDD 116 is not displayed in the meeting room where the new participant participates. Here, among meeting rooms A, B, C, the meeting room where the new participant participates may be shown.

In step S121, the prohibition image is transmitted to the one of projectors 200, 200A, 200B that is installed in the meeting room where the new participant participates, and the process proceeds to step S122. Specifically, the prohibition image shown in FIG. 12 is transmitted. In step S122, similar to step S114, it is determined whether or not a permission signal is received. If a permission signal is received, the process proceeds to step S123, and if not, the process proceeds to step S124. In step S123, the output data is transmitted to the one of projectors 200, 200A, 200B that is installed in the meeting room where the new participant participates. Thus, the one of projectors 200, 200A, 200B that is installed in the meeting room where the new participant participates projects the image of the output data. Therefore, the new participant can see the image of the output data.

The processing in step S124 and step S125 is similar to that in step S27 and step S28 shown in FIG. 14, and therefore the description will not be repeated here. In step S126, the combination data is transmitted to all the destinations to which the output data has already been output. Then, in step S127, it is determined whether or not a log-out signal is received from projector 200. If a log-out signal is received, the data output process ends, and if not, the process returns to step S106.

As described above, when outputting data obtained by reading a document image in image reading portion 20 or data stored in HDD 116 to projectors 200, 200A, 200B, MFP 100 in the present embodiment obtains, as participant information, the user identification information of the participants present in each of meeting rooms A, B, C in which projectors 200, 200A, 200B are respectively installed. Then, based on the participant information, it is determined whether or not the user identified by the participant information can access the obtained data, and in addition, based on the determination result as to whether access is allowed or not, it is determined whether the obtained data can be output or not, for each of projectors 200, 200A, 200B. If the participant cannot access the data, the data is not allowed to be output, thereby preventing leakage of confidential data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A meeting system including a data processing apparatus and a display device configured to display an image based on data obtained from said data processing apparatus,
said data processing apparatus comprising:
a data obtaining portion, executed by a processor, configured to obtain image data corresponding to user identification information for identifying a user, the image data being read from or stored in a document;
a participant information obtaining portion, executed by a processor, configured to obtain said user identification information in accordance with one or more meeting participants entering or leaving a meeting room as participant information indicating said meeting participants;
an access permission determination portion, executed by a processor, configured to determine whether or not a user identified by said participant information can access said obtained image data, based on said user identification information corresponding to said image data and said participant information obtained from said participant information obtaining portion;
an output permission determination portion, executed by a processor, configured to determine that said obtained image data can be outputted, if all of said meeting participants can access said obtained image data, as a result of determination by said access permission determination portion, and to determine that said obtained image data cannot be outputted, if any one of said meeting participants cannot access said obtained image data;
an output portion, executed by a processor, configured to output said image data to said display device on condition that it is determined by said output permission determination portion that said image data can be outputted, and to prohibit outputting said image data to said display device when it is determined by said output permission determination portion that said image data cannot be outputted; and
a permission portion, executed by a processor, configured to accept an instruction for permission of display from one of said meeting participants, if it is prohibited by said output portion to output said image data to said display device, and to allow said output portion to output said image data to said display device based on said user identification information corresponding to said image data and based on said participant information obtained from said participant information obtaining portion when said one of said meeting participants providing said instruction for permission is a user who can access said obtained image data.

2. A data processing apparatus connected to a display device to display an image, comprising:
a data obtaining portion, executed by a processor, configured to obtain image data corresponding to user identification information for identifying a user, the image data being read from or stored in a document;

a participant information obtaining portion, executed by a processor, configured to obtain said user identification information in accordance with one or more meeting participants entering or leaving a meeting room as participant information indicating said meeting participants;

an access permission determination portion, executed by a processor, configured to determine whether or not a user identified by said participant information can access said obtained image data, based on said user identification information corresponding to said image data and said participant information obtained from said participant information obtaining portion;

an output permission determination portion, executed by a processor, configured to determine that said obtained image data can be outputted, if all of said meeting participants can access said obtained image data, as a result of determination by said access permission determination portion, and to determine that said obtained image data cannot be outputted, if any one of said meeting participants cannot access said obtained image data;

an output portion, executed by a processor, configured to output said image data to said display device on condition that it is determined by said output permission determination portion that said image data can be outputted, and to prohibit outputting said image data to said display device when it is determined by said output permission determination portion that said image data cannot be outputted;

a permission portion, executed by a processor, configured to accept an instruction for permission of display from one of said meeting participants, if it is prohibited by said output portion to output said image data to said display device, and to allow said output portion to output said image data to said display device based on said user identification information corresponding to said image data and based on said participant information obtained from said participant information obtaining portion when said one of said meeting participants providing said instruction for permission is a user who can access said obtained image data.

3. The data processing apparatus according to claim 2, further comprising:

an image reading portion configured to read an image; and a combination portion, executed by a processor, configured to generate combination data by combining an image read by said image reading portion with image data obtained by said data obtaining portion, wherein said output portion is configured to output said combination data.

4. The data processing apparatus according to claim 2, further comprising a document reading portion configured to read a document image formed on a recording medium, wherein said data obtaining portion is configured to obtain data obtained by said document reading portion reading a document image.

5. The data processing apparatus according to claim 2, further comprising:

an authentication portion, executed by a processor, configured to authenticate a user; and a proxy authentication information storage portion configured to store proxy authentication information which relates user identification information with proxy information, wherein if said proxy information is accepted and authentication with the proxy information is successful, said authentication portion is configured to authenticate as a user having said user identification information related to the proxy information by said proxy authentication information, and if authentication with said proxy information by said authentication portion is successful, said data obtaining portion is configured to obtain data that can be accessed by the user having said user identification info nation related to said proxy information by said proxy authentication information.

6. The data processing apparatus according to claim 2, wherein said participant information obtaining portion obtains said corresponding user identification information obtained together with image data obtained by said data obtaining portion.

7. The data processing apparatus according to claim 2, further comprising a data storage portion having a plurality of storage regions to store data in said plurality of storage regions, wherein said data obtaining portion is configured to obtain said data from any one of said plurality of storage regions of said data storage portion, and said access permission determination portion is configured to determine whether or not a user identified by said participant information can access said storage region in which data obtained by said data obtaining portion is stored.

8. The data processing apparatus according to claim 2, wherein said participant information obtaining portion is configured to obtain user identification information included in a participant list stored beforehand.

9. The data processing apparatus according to claim 2, wherein said participant information obtaining portion is connected to a user recognition apparatus configured to accept user identification information of a user to obtain said user identification information accepted by said user recognition apparatus.

10. The data processing apparatus according to claim 2, further comprising:

a biometric information obtaining portion configured to obtain biometric information of a user; and a user information storage portion configured to store a pair of user identification information and biometric information, wherein said participant information obtaining portion obtains user identification information of the same pair as biometric information obtained by said biometric information obtaining portion.

11. The data processing apparatus according to claim 2, wherein said participant information obtaining portion configured to obtain said participant information for each of a plurality of destinations of said obtained data, said output permission determination portion is configured to determine whether said image data can be outputted or not, for each of said plurality of destinations, and said output portion is configured to output said data to a destination determined by said output permission determination portion that said image data can be outputted, among said plurality of destinations.

12. The data processing apparatus according to claim 2, wherein when new participant information is obtained by said participant information obtaining portion after said output portion outputs said obtained image data, it is determined by said access permission determination portion that a user identified by said new participant information cannot access said obtained image data, and it is determined by said output permission determination portion that said obtained image data cannot be output based on that any one of said meeting participants including said new participant information cannot access said obtained image data, said output portion is configured to output predetermined data in place of said obtained image data.

13. A data output method performed in a data processing apparatus connected to a display device to display an image, comprising the steps of:
   obtaining image data for display, corresponding to user identification information for identifying a user, the image data being read from or stored in a document;
   obtaining user said identification information in accordance with one or more meeting participants entering or leaving a meeting room as participant information indicating said meeting participants participant;
   determining whether or not a user identified by said participant information can access said obtained image data, based on said user identification information corresponding to said image data and said obtained participant information;
   if all of said meeting participants can access said obtained image data, as a result of determination in said step of determining whether to access, determining that said obtained image data can be outputted, and if any one of said meeting participants cannot access said obtained image data, determining that said obtained image data cannot be outputted;
   outputting said image data to said display device on condition that it is determined, in said step of determining whether to output, that said image data can be outputted, and prohibiting outputting said image data to said display device when it is determined in said step of determining that said image data cannot be outputted; and
   accepting an instruction for permission of display from one of said meeting participants, if it is prohibited in said output step to output said image data to said display device, and to allow outputting said image data to said display device based on said user identification information corresponding to said image data and based on said obtained participant information obtained in accordance with a meeting participant entering or leaving a meeting room when said one of said meeting participants providing said instruction for permission is a user who can access said obtained image data.

14. A data output program embodied on a computer readable medium for causing a computer, which controls a data processing apparatus connected to a display device to display an image, to execute processing including the steps of:
   obtaining image data for display, corresponding to user identification information for identifying a user, the image data being read from or stored in a document;
   obtaining user said identification information in accordance with one or more meeting participants entering or leaving a meeting room as participant information indicating said meeting participants participant;
   determining whether or not a user identified by said participant information can access said obtained image data, based on said user identification information corresponding to said image data and said obtained participant information;
   if all of said meeting participants can access said obtained image data, as a result of determination in said step of determining whether to access, determining that said obtained image data can be outputted, and if any one of said meeting participants cannot access said obtained image data, determining that said obtained image data cannot be outputted;
   outputting said image data to said display device on condition that it is determined, in said step of determining whether to output, that said image data can be outputted, and prohibiting outputting said image data to said display device when it is determined in said step of determining that said image data cannot be outputted; and
   accepting an instruction for permission of display from one of said meeting participants, if it is prohibited in said output step to output said image data to said display device, and to allow outputting said image data to said display device based on said user identification information corresponding to said image data and based on said obtained participant information obtained in accordance with a meeting participant entering or leaving a meeting room when said one of said meeting participants providing said instruction for permission is a user who can access said obtained image data.

* * * * *